United States Patent
Sakhnini et al.

(10) Patent No.: US 11,696,301 B2
(45) Date of Patent: Jul. 4, 2023

(54) TECHNIQUES FOR CONFIGURING CONTROL RESOURCES USING PIGGYBACK DOWNLINK CONTROL INFORMATION

(71) Applicant: QUALCOMM Incorporated, San Diego, CA (US)

(72) Inventors: Iyab Issam Sakhnini, San Diego, CA (US); Qiang Wu, San Diego, CA (US); Tao Luo, San Diego, CA (US); Jun Ma, San Diego, CA (US); Mehmet Izzet Gurelli, San Diego, CA (US); Ahmed Abdelaziz Ibrahim Abdelaziz Zewail, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/235,773

(22) Filed: Apr. 20, 2021

(65) Prior Publication Data

US 2021/0329681 A1  Oct. 21, 2021

Related U.S. Application Data

(60) Provisional application No. 63/013,447, filed on Apr. 21, 2020.

(51) Int. Cl.
*H04W 72/23* (2023.01)
(52) U.S. Cl.
CPC ................... *H04W 72/23* (2023.01)

(58) Field of Classification Search
CPC ............... H04W 72/042; H04W 72/1289
(Continued)

(56) References Cited

U.S. PATENT DOCUMENTS 9,420,576 B2   8/2016   Chen et al.
10,757,690 B2  8/2020   Sun et al.
(Continued)

FOREIGN PATENT DOCUMENTS

CN   102265687 A   11/2011
CN   102783064 A   11/2012
(Continued)

OTHER PUBLICATIONS

Ericsson: "Introduction of LC/CE MTC", 3GPP TSG-RAN WG1 Meeting #83, R1-157918, Anaheim, USA, Nov. 15, 2015-Nov. 22, 2015, pp. 1-117, Dec. 5, 2015.
(Continued)

*Primary Examiner* — Peter G Solinsky
(74) *Attorney, Agent, or Firm* — Loza & Loza, LLP/Qualcomm Incorporated

(57) ABSTRACT

A scheduling entity can schedule regular or periodic control resources (CORESETs) that are relatively sparse in the time domain compared to dynamic CORESETS. Sparsely scheduled regular CORESETs can reduce the overhead incurred by a user equipment for monitoring the control channels in the CORESETs or search spaces. When the network has a burst of data to send, the scheduling entity can use downlink control information (DCI) piggybacked in physical downlink shared channel (PDSCH) resources to schedule dynamic CORESETs between the regular CORESETs. The dynamic CORESETs can provide resources for a PDSCH and/or physical downlink shared channel (PUSCH).

30 Claims, 17 Drawing Sheets

(58) Field of Classification Search
USPC .......................................................... 370/329
See application file for complete search history.

(56) References Cited

U.S. PATENT DOCUMENTS

| | | |
|---|---|---|
| 2010/0111226 A1 | 5/2010 | Ko et al. |
| 2013/0016687 A1 | 1/2013 | Yang et al. |
| 2013/0039272 A1* | 2/2013 | Chen .................... H04W 76/25 |
| | | 370/328 |
| 2013/0114495 A1 | 5/2013 | Chen et al. |
| 2013/0242882 A1 | 9/2013 | Blankenship et al. |
| 2014/0177586 A1 | 6/2014 | Jang et al. |
| 2015/0085787 A1 | 3/2015 | Ouchi |
| 2015/0351040 A1 | 12/2015 | Park et al. |
| 2016/0065338 A1 | 3/2016 | Kim et al. |
| 2016/0128028 A1 | 5/2016 | Malli et al. |
| 2016/0301556 A1 | 10/2016 | Nory et al. |
| 2018/0124753 A1* | 5/2018 | Sun ..................... H04W 72/042 |
| 2020/0036489 A1* | 1/2020 | Wang ................... H04L 5/0035 |
| 2020/0100223 A1* | 3/2020 | Park ..................... H04L 5/0091 |
| 2020/0213978 A1 | 7/2020 | Iyer et al. |
| 2021/0022128 A1* | 1/2021 | Chen .................... H04W 72/046 |
| 2021/0176758 A1* | 6/2021 | Bae ...................... H04L 1/1819 |
| 2021/0243745 A1* | 8/2021 | Fan ..................... H04B 7/2656 |
| 2022/0232558 A1* | 7/2022 | Shin ......................... H04L 1/00 |

FOREIGN PATENT DOCUMENTS

| | | |
|---|---|---|
| CN | 110545562 A | 12/2019 |
| CN | 110892664 A | 3/2020 |
| EP | 2193615 A2 | 6/2010 |
| EP | 2525522 A1 | 11/2012 |
| WO | 2014176204 | 10/2014 |
| WO | 2015021185 A1 | 2/2015 |
| WO | 2015142900 A1 | 9/2015 |
| WO | 2018085429 A1 | 5/2018 |
| WO | 2019213921 A1 | 11/2019 |

OTHER PUBLICATIONS

Ericsson: "NB-IoT-DCI Content", 3GPP TSG-RAN1—Ad Hoc NB-IoT, Sophia Antipolis, France, R1-161821, Mar. 16, 2016, 3 Pages, Mar. 22, 2016-Mar. 24, 2016.
International Search Report and Written Opinion—PCT/US2021/028450—ISA/EPO—dated Jul. 29, 2021.
KT Corp: "Views on DL HARQ ACK/NACK Feedback for NB-IoT", Mar. 15, 2016.

* cited by examiner

TECHNIQUES FOR CONFIGURING CONTROL RESOURCES USING PIGGYBACK DOWNLINK CONTROL INFORMATION

PRIORITY CLAIM

This application claims priority to and the benefit of provisional patent application No. 63/013,447 filed in the United States Patent Office on Apr. 21, 2020, the entire content of which is incorporated herein by reference as if fully set forth below in its entirety and for all applicable purposes.

TECHNICAL FIELD

The technology discussed below relates generally to wireless communication systems, and more particularly, to techniques for configuring control resource sets and search spaces using piggyback downlink control information.

INTRODUCTION

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, spatial division multiple access (SDMA), single-carrier frequency division multiple access (SC-FDMA) systems, and so on.

These multiple access technologies have been adopted in various telecommunication standards to provide a common protocol that enables different wireless devices to communicate on a municipal, national, regional, and even global level. Fifth-generation (5G) New Radio (NR) is a set of enhancements to the Long-Term Evolution (LTE) mobile standard promulgated by the $3^{rd}$ Generation Partnership Project (3GPP). NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation. In NR, a scheduling entity can use sparsely scheduled regular control resource sets and dynamically scheduled control resource sets to schedule the downlink resources, for example, for a physical downlink shared channel (PDSCH) and a physical uplink shared channel (PUSCH).

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the present disclosure provides a method of wireless communication at a scheduling entity. The method includes configuring a first control resource set (CORESET) and a second CORESET for wireless communication with a user equipment (UE). The method further includes transmitting, to the UE, a piggyback downlink control information (DCI) in a downlink data channel using downlink data channel resources that are temporally configured between the first CORESET and the second CORESET, for altering one or more third CORESETs temporally configured between the first CORESET and the second CORESET.

Another aspect of the present disclosure provides a scheduling entity. The scheduling entity includes a communication interface configured to communicate with a user equipment (UE), a memory, and a processor operatively coupled with the communication interface and the memory. The processor and the memory are configured to configure a first control resource set (CORESET) and a second CORESET for wireless communication with the UE. The processor and the memory are further configured to transmit, to the UE using the communication interface, a piggyback downlink control information (DCI) in a downlink data channel using downlink data channel resources that are temporally configured between the first CORESET and the second CORESET, for altering one or more third CORESETs temporally configured between the first CORESET and the second CORESET.

Another aspect of the present disclosure provides a method of wireless communication at a user equipment (UE). The method includes receiving, from a scheduling entity, control information for configuring a first control resource set (CORESET) and a second CORESET. The method further includes receiving, from the scheduling entity, a piggyback downlink control information (DCI) in a downlink data channel using downlink data channel resources temporally configured between the first CORESET and the second CORESET. The piggyback DCI is configured to alter one or more third CORESETs temporally configured between the first CORESET and the second CORESET.

Another aspect of the present disclosure provides a user equipment (UE). The UE includes a communication interface configured to communicate with a scheduling entity, a memory, and a processor operatively coupled with the communication interface and the memory. The processor and the memory are configured to receive, from the scheduling entity using the communication interface, control information for configuring a first control resource set (CORESET) and a second CORESET. The processor and the memory are further configured to receive, from the scheduling entity, a piggyback downlink control information (DCI) in a downlink data channel using downlink data channel resources temporally configured between the first CORESET and the second CORESET. The piggyback DCI is configured to control one or more third CORESETs temporally configured between the first CORESET and the second CORESET.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more examples may be discussed as having certain advantageous features, one or more of such features may also be used in accordance with the various examples discussed herein. In similar fashion, while exemplary implementations may be discussed below as devices, systems, or methods it should be understood that such examples can be implemented in various devices, systems, and methods.

DETAILED DESCRIPTION

Figure 1:
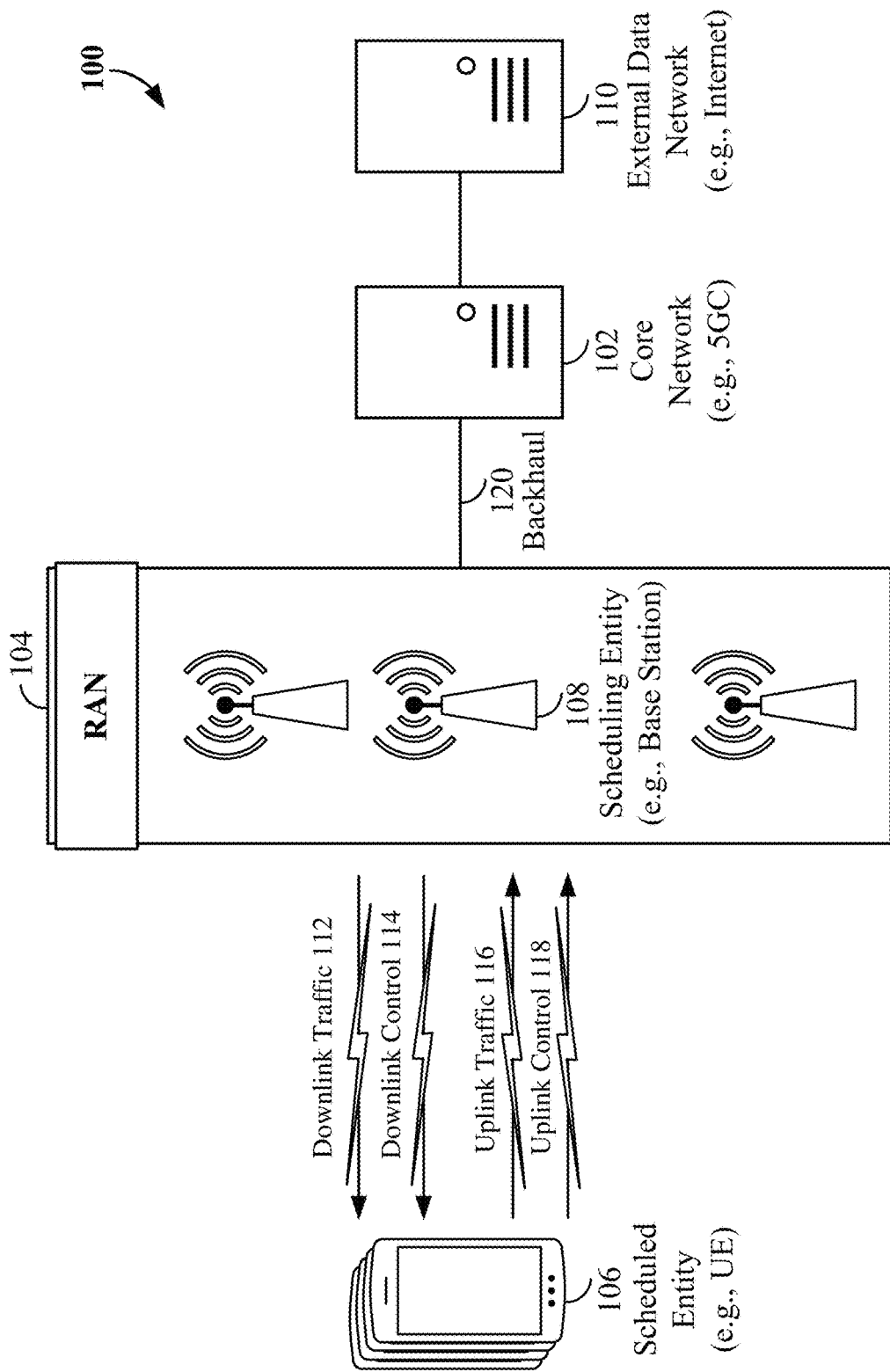
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Aspects of the present disclosure relate to control channel resources configuration using piggyback downlink control information (DCI) in a physical downlink shared channel (PDSCH) for wireless communication. In some aspects, a piggyback DCI is downlink control information transmitted in communication resources of a downlink data channel (e.g., PDSCH).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
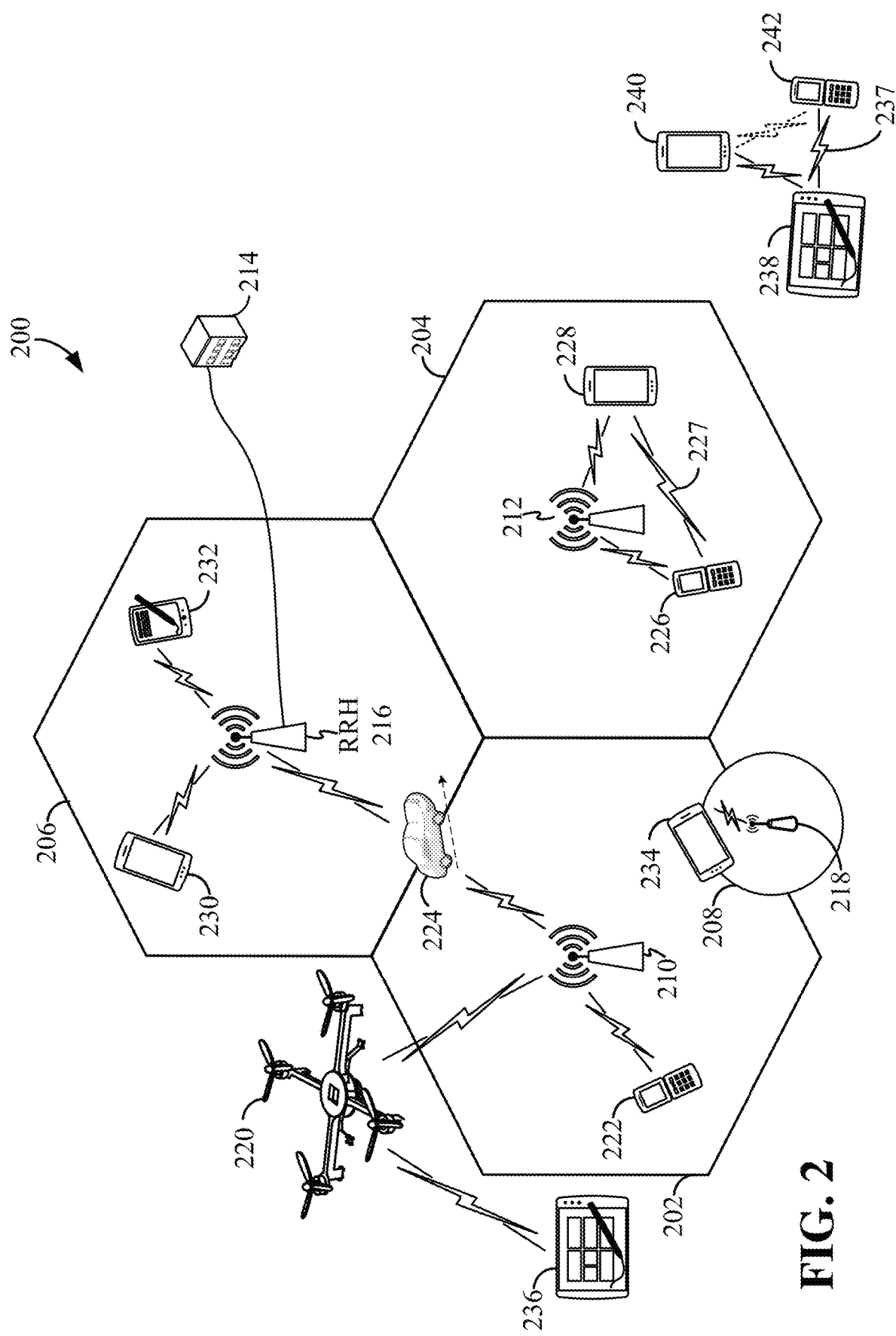
FIG. 2 is a conceptual illustration of an exemplary radio access network according to some aspects of the disclosure.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
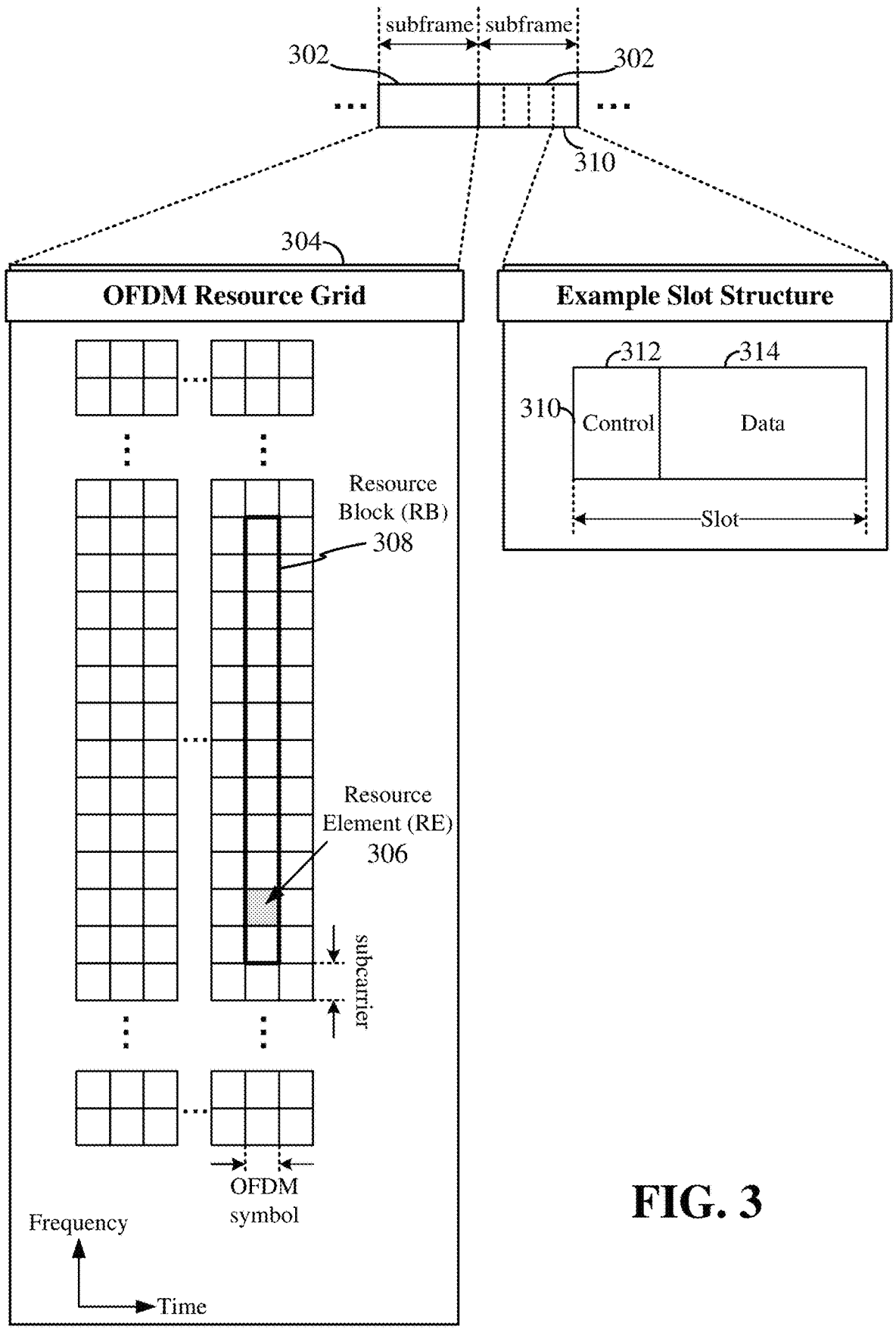
FIG. 3 is a schematic illustration of an organization of wireless resources in an air interface utilizing orthogonal frequency divisional multiplexing (OFDM) according to some aspects of the disclosure.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
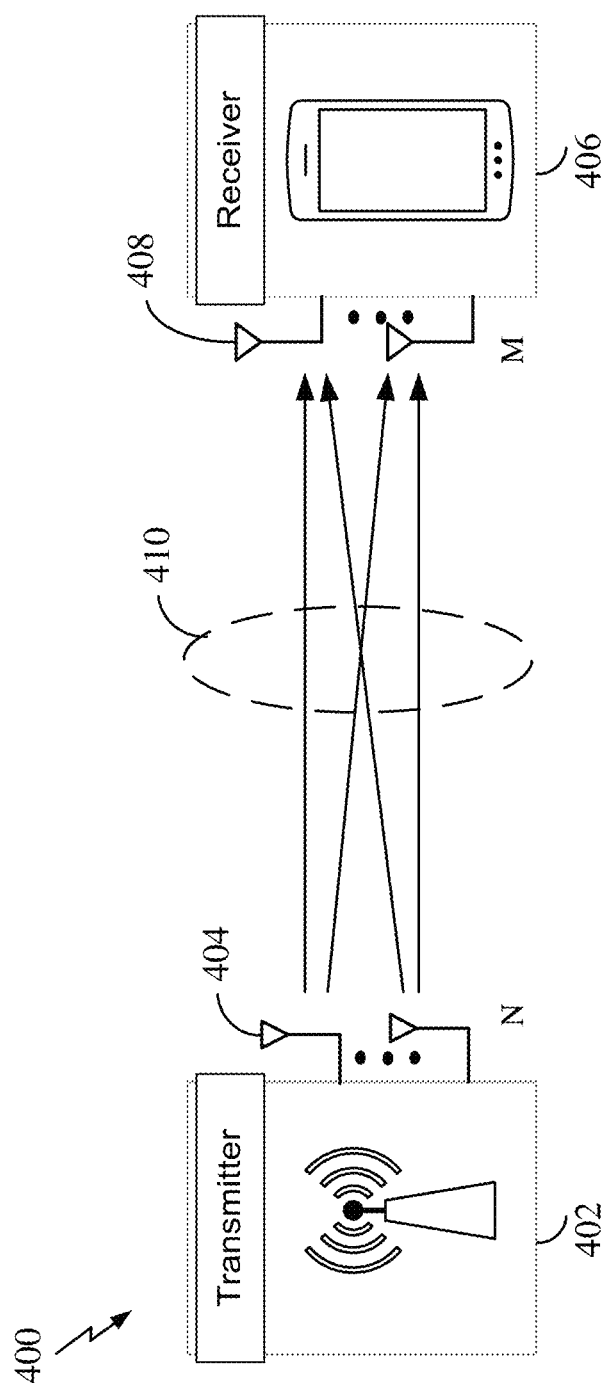
FIG. 4 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable device. In some examples, the transmitter and receiver are each wireless communication devices (e.g., UEs or V2X devices) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink signals and channels, including the physical uplink control channel (PUCCH), physical uplink shared channel (PUSCH), and sounding reference signal (SRS). In addition, beamformed signals may further be utilized in D2D systems, such as NR sidelink (SL) or V2X, utilizing FR2.

Search Spaces and CORESET

Figure 5:
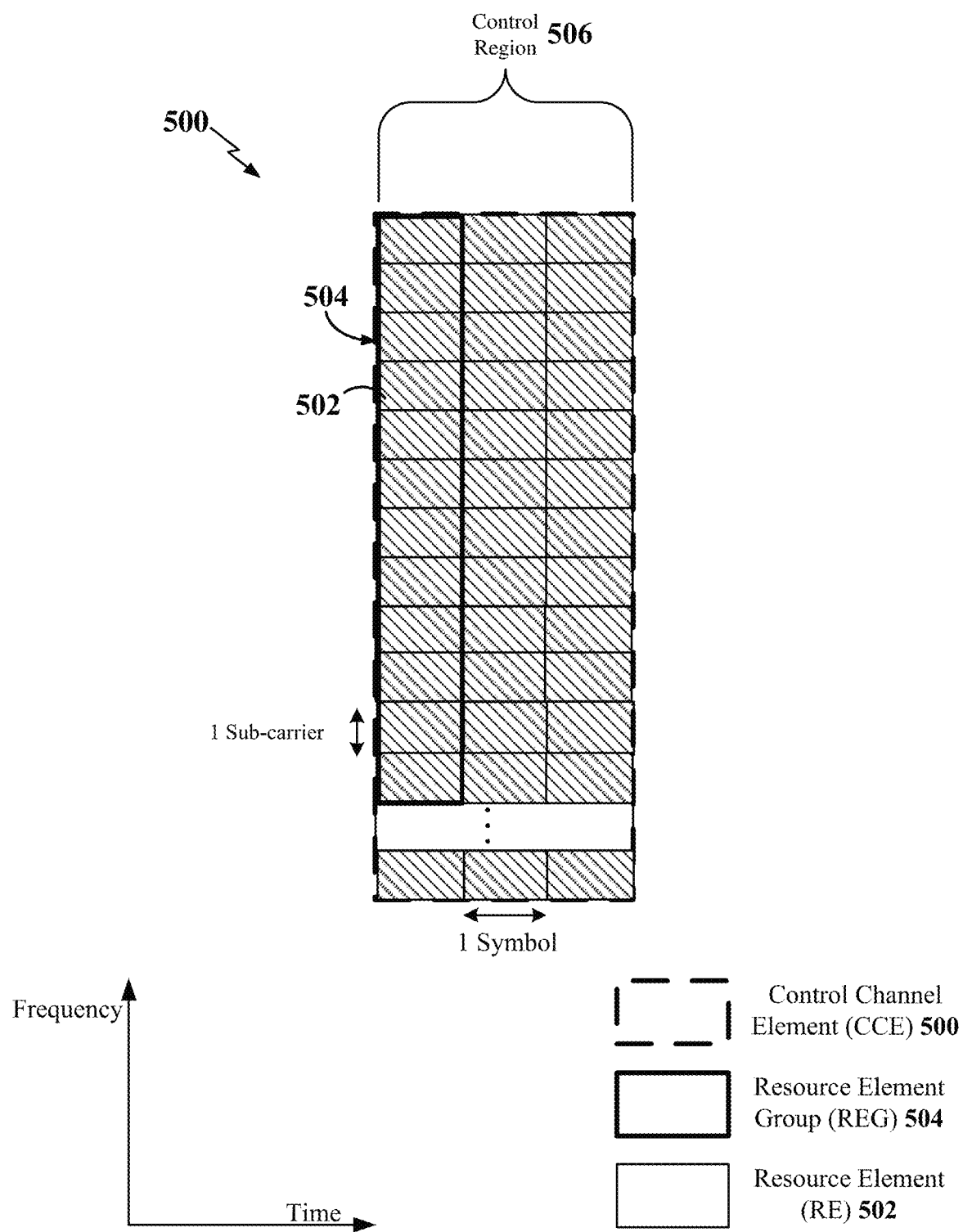
FIG. 5 is a schematic illustration of an exemplary control channel element (CCE) structure in a DL control portion of a slot according to some aspects.

FIG. 5 is a schematic illustration of an exemplary control channel element (CCE) 500 structure in a DL control portion 506 of a slot according to some aspects. The slot may correspond, for example, to the slot illustrated in FIG. 3. The CCE 500 structure of FIG. 5 represents a portion of the DL control portion 506, including a number of REs 502 that may be grouped into resource element groups (REGs) 504. Each REG 504 generally may contain, for example, twelve consecutive REs 502 (or nine REs 502 and three DMRS REs) within the same OFDM symbol and the same RB. In this example, the CCE structure 500 includes at least six REGs 504 distributed across three OFDM symbols. However, as those skilled in the art will readily appreciate, the CCE 500 structure for any particular application may vary from the example described herein, depending on any number of factors. For example, the CCE 500 structure may contain any suitable number of REGs.

In some examples, the PDCCH may be constructed from a variable number of CCEs, depending on the PDCCH format (or aggregation level). Each PDCCH format (or aggregation level) can support a different DCI length. In some examples, PDCCH aggregation levels of 1, 2, 4, 8, and 16 may be supported, corresponding to 1, 2, 4, 8, or 16 contiguous CCEs, respectively.

Since the UE is unaware of the particular aggregation level of the PDCCH or whether multiple PDCCHs may exist for the UE in the slot, the UE may perform blind decoding of various PDCCH candidates within the first N control OFDM symbols (as indicated by the slot format of the slot) based on an expected radio network temporary identifier (RNTI) (e.g., UE-specific RNTI or group RNTI). Each PDCCH candidate includes a collection of one or more consecutive CCEs based on an assumed DCI length (e.g., PDCCH aggregation level).

To limit the number of blind decodes, search spaces defining UE-specific search spaces (USSs) and common search spaces (CSSs) may be defined. The search space sets (e.g., USSs and CSSs) configured for a UE limit the number of blind decodes that the UE performs for each PDCCH format combination. The starting point (offset or index) of a UE-specific search space may be different for each UE, and each UE may have multiple UE-specific search spaces (e.g., one for each aggregation level). The common search space sets consist of CCEs used for sending control information that is common to a group of UEs or to all UEs. Thus, the common search space sets are monitored by multiple UEs in a cell. The starting point (offset or index) of a search space set for group common control information may be the same for all UEs in the group, and there may be multiple search space sets defined for group common control information (e.g., one for each configured aggregation level for the group of UEs). The UE may perform blind decoding over all aggregation levels and corresponding USSs or CSSs to determine whether at least one valid DCI exists for the UE.

Figure 6:
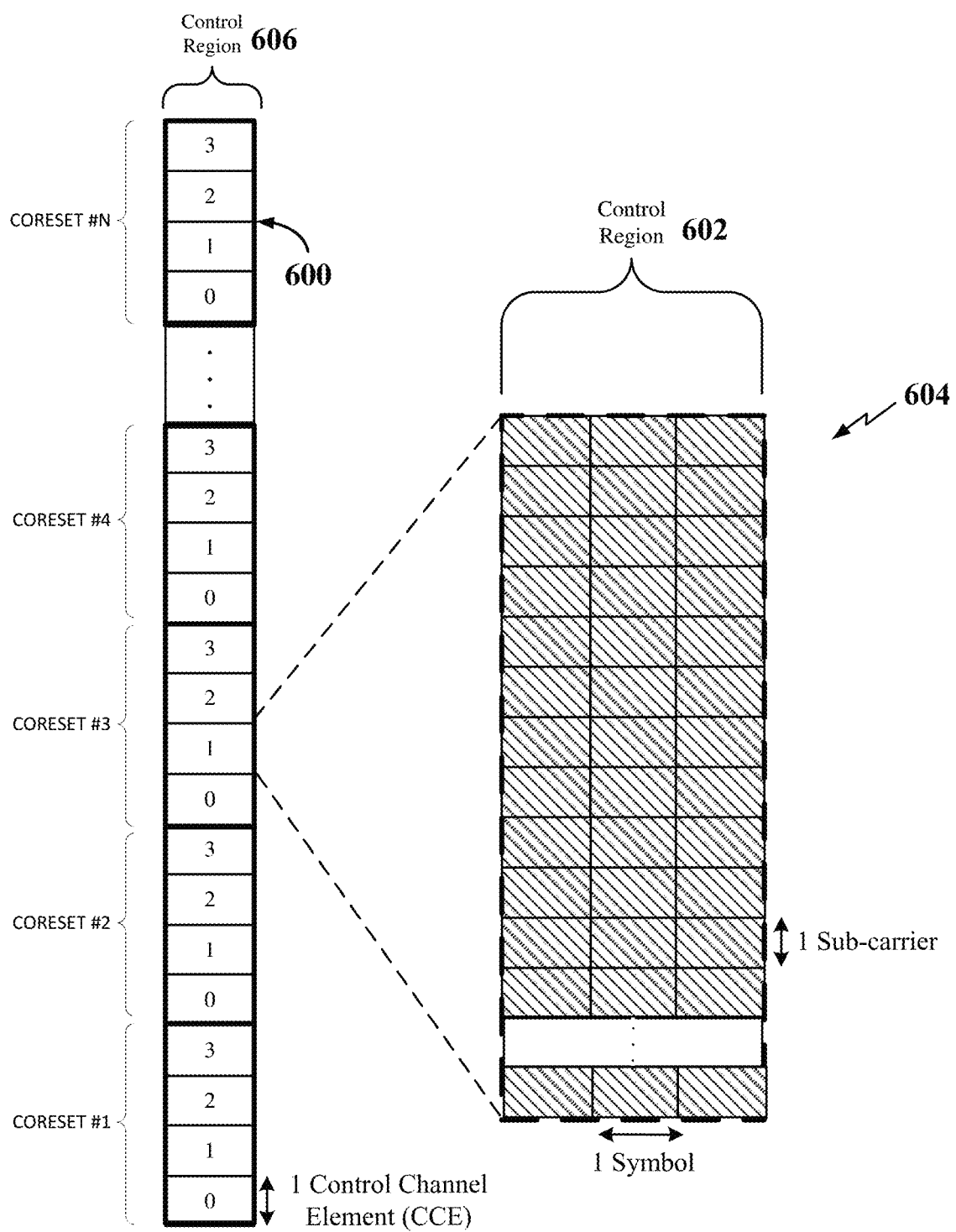
FIG. 6 is a schematic illustration of a number of example CORESETs of a DL control portion of a slot according to some aspects.

FIG. 6 is a schematic illustration of a number of example CORESETs 600 of a DL control portion 602 of a slot according to some aspects. The DL control portion 602 may correspond, for example, to the DL control portion illustrated in FIG. 3. A control resource set (CORESET) 600 may be configured for group common control information or UE-specific control information and may be used for transmission of a PDCCH including the group common control information or UE-specific control information to a set of one or more UEs. The UE may monitor one or more CORESETs 600 that the UE is configured to monitor for the UE-specific or group common control information.

Each CORESET 600 represents a portion of the DL control portion 602 including a number of sub-carriers in the frequency domain and one or more symbols in the time domain. In the example of FIG. 6, each CORESET 600 includes at least one CCE 604 having dimensions in both frequency and time, sized to span across at least three OFDM symbols. A CORESET having a size that spans across two or more OFDM symbols may be beneficial for use over a relatively small system bandwidth (e.g., 5 MHz). However, a one-symbol CORESET may also be possible.

A plurality of CORESETs 600 indexed as CORESET #1-CORESET #N are shown as occurring during three OFDM symbols in the time domain and occupying a first region of frequency resources in the frequency domain of the DL control portion 602. In the example shown in FIG. 6, each CORESET 600 include four CCEs 604. It should be noted that this is just one example. In another example, each CORESET 600 may include any suitable number of CCEs 604. The number of CCEs 604 and configuration of CCEs 604 for each CORESET 600 may be dependent, for example, on the aggregation level applied to the PDCCH.

As described above, a search space for a UE is indicated by a set of contiguous CCEs that the UE should monitor for downlink assignments and uplink grants relating to a particular component carrier for the UE. In the example shown in FIG. 6, the plurality of CORESETs 600 may form a search space 606, which may be a USS or a CSS. Within a USS, the aggregation level of a PDCCH may be, for example, 1, 2, 4, or 8 consecutive CCEs and within a CSS, the aggregation level of the PDCCH may be, for example 4 or 8 consecutive CCEs. In addition, the number of PDCCH candidates within each search space may vary depending on the aggregation level utilized. For example, for a USS with an aggregation level of 1 or 2, the number of PDCCH candidates may be 6. In this example, the number of CCEs in the USS search space 606 for an aggregation level of 1 may be 6, and the number of CCEs in the USS search space 606 for an aggregation level of 2 may be 12. However, for a USS with an aggregation level of 4 or 8, the number of PDCCH candidates may be 2. In this example, the number of CCEs in the USS search space 606 for an aggregation level of 4 may be 8, and the number of CCEs in the USS search space 606 for an aggregation level of 8 may be 16. For a CSS search space 606, the number of CCEs in the search space 606 may be 16 regardless of the aggregation level.

In 5G NR, a UE may monitor one or more CORESETs/PDCCHs in one or more CSS and/or USS that are defined for a given UE. The PDCCH can carry downlink control information (DCI) for one or more UEs in a cell. A scheduling entity (e.g., gNB or base station) can use the DCI to provide dynamic scheduling or control information to a UE. In some aspects, the DCI can include, but is not limited to, power control commands, scheduling information, a resource grant, and/or an assignment of communication resources (e.g., REs) for DL and UL transmissions. In a network, a scheduling entity (e.g., eNB or gNB) may schedule periodic CORESETs that can be relatively sparse to dynamic CORESETs, for example, using semi-static scheduling (e.g., radio resource control (RRC)). This type of sparse (e.g., in time domain) periodic control resources may be called regular CORESETs in this disclosure. In high band applications (e.g., FR4 and FR5 bands), the slot duration is shorter than lower bands. In this case, using sparse regular CORESETs can reduce PDCCH monitoring overhead at a UE.

However, using a sparse regular CORESET configuration may be less flexible in scheduling and increase latency. An exemplary CORESET configuration may configure a CORESET (e.g., periodic CORESET) to occur according to a predetermined period. In some aspects of the disclosure, a scheduling entity may dynamically indicate additional control channel resources in certain conditions, for example, to accommodate an increase of actual or anticipated traffic (e.g., burst user data) targeting a particular UE. In some aspects of the disclosure, the scheduling entity may indicate or configure additional dynamic control resources (e.g., dynamic CORESETs) by dynamic signaling, for example, via a PDCCH/DCI in a periodic or regular CORESET. The DCI is dynamic in nature, and each DCI may or may not indicate one or more dynamic CORESETs. Unlike regular control channel resources, the dynamic resources are non-recurring (aperiodic) and may be for one-shot (or a limited number of) monitoring occasions.

In some aspects, the scheduling entity may configure a UE with dynamic control channel resources (e.g., CORESETs). Based on the configuration and a dynamic indication (e.g., DCI or media access control (MAC) control element (CE)), the UE can monitor the PDCCH/DCI within the dynamic control channel resources. For example, the dynamic control channel resources may be one or more dynamic CORESETs that are not regularly scheduled or are aperiodic. In some aspects, a PDCCH can be confined to one CORESET and transmitted with its own DM-RS enabling UE-specific beamforming of the control channel. A scheduling entity can use various numbers of control channel elements (CCEs) to carry a PDCCH to accommodate different DCI payload size and/or different coding rates. The CCE-to-REG mapping for a CORESET can be interleaved (for frequency diversity) or non-interleaved (for localized beam-forming).

In some aspects of the disclosure, a scheduling entity 108 (e.g., base station, eNB, or gNB) can send a piggyback DCI in a PDSCH to dynamically configure control resources (e.g., dynamic or aperiodic CORESETs) for one or more UEs. The piggyback DCI can be multiplexed with the PDSCH in communication resources (e.g., time, frequency, and/or spatial resources) allocated to the downlink resources (e.g., PDSCH resources). A piggyback DCI can use some or all communication resources of the PDSCH. In one aspect, the scheduling entity can use the piggyback DCI to schedule or activate one or more new CORESETs or search space (SS) sets. The new CORESETs may be dynamic/aperiodic or regular/periodic. In one aspect, the scheduling entity can modify one or more existing CORESETs/SS sets that may be dynamic or regular. In one aspect, the scheduling entity can skip, release, or deactivate one or more existing CORESETs or SS sets that may be dynamic or regular.

Exemplary Control Resources Activation Using DCI Piggyback on PDSCH

Figure 7:
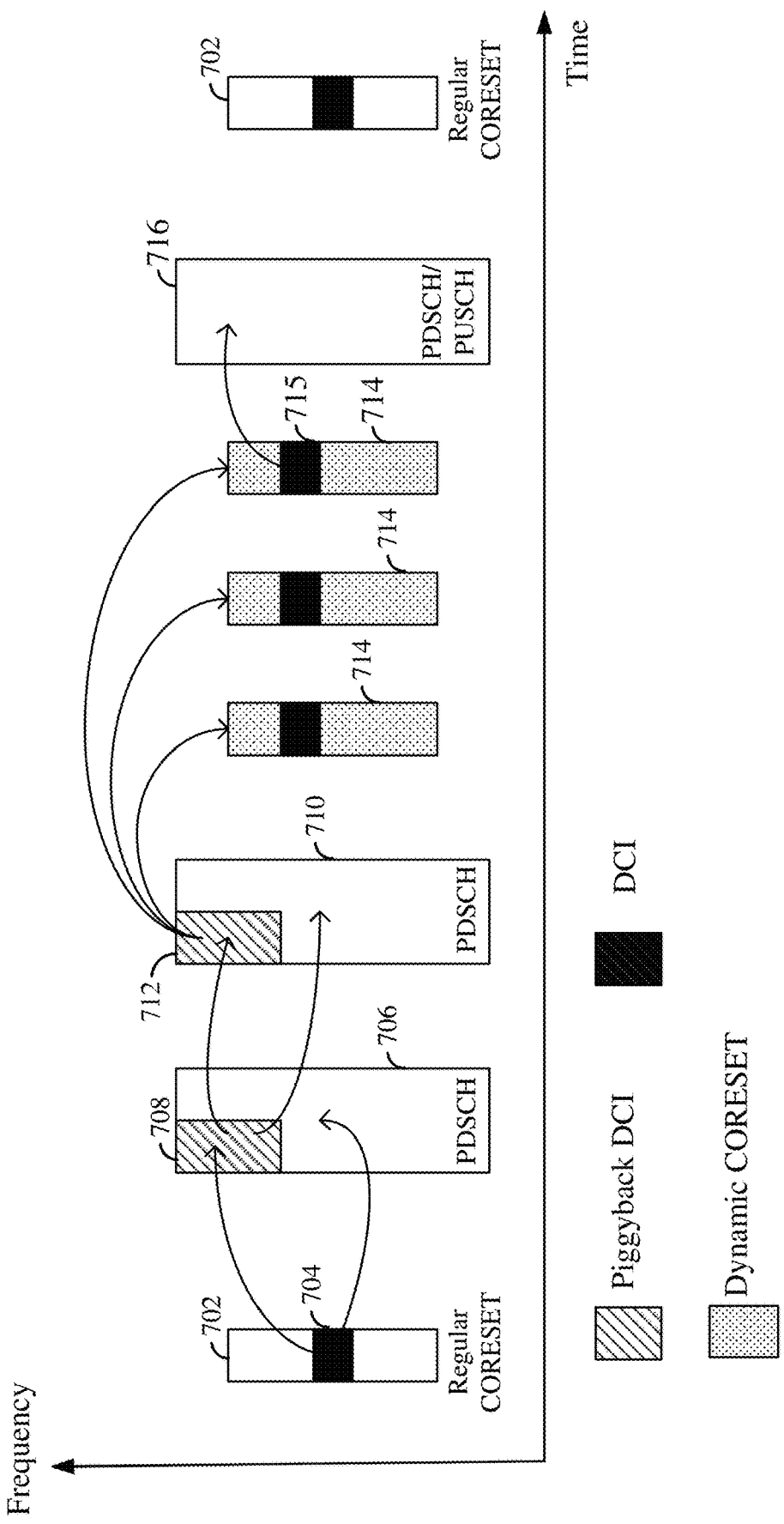
FIG. 7 is a drawing illustrating an example of dynamic control resources activation using piggyback downlink control information (DCI) according to some aspects of the disclosure.

FIG. 7 is a drawing illustrating an example of dynamic control resources activation using piggyback DCI according to some aspects of the disclosure. A scheduling entity 108 may schedule regular or periodic control resources (e.g., CORESETs 702) that are relatively sparse in the time domain compared to dynamic CORESETS, which will be described in more detail below. For example, the regular or periodic CORESET 702 can occur once in a predetermined number of slots. Sparsely scheduled regular CORESETs can reduce the overhead incurred by a UE for monitoring the control channels (e.g., PDCCHs/DCI) in the CORESETs or search spaces. When the network has a burst of data to send/receive, the scheduling entity can use DCI piggybacked in PDSCH resources to schedule one or more upcoming PDSCH or PUSCH data transmissions (in between the regular CORESETs). In some cases, if the network anticipates upcoming data, the scheduling entity can schedule one or more dynamic or aperiodic CORESETs between the regular CORESETs in case that the anticipated data actually arrives.

Referring to FIG. 7, the scheduling entity can transmit a DCI 704 in a regular CORESET 702 to schedule a first PDSCH 706 with a first piggyback DCI 708. The first piggyback DCI 708 can schedule a second PDSCH 710 with a second piggyback DCI 712. In some cases, the second piggyback DCI 712 can schedule or activate dynamic control resources (e.g., dynamic CORESETs 714) that can provide additional scheduling opportunities for actual or anticipated user data traffic between regular CORESETs 702, which are relatively sparse in time compared to the dynamic CORESETs 714. In this case, the dynamic CORESETs 714 are temporally configured between the regular CORESETs 702. In this disclosure, a first CORESET is temporally configured between a second CORESET and a third CORESET when the first CORESET occurs in time between the second CORESET and the third CORESET. The time interval between two dynamic CORESETs 714 can be shorter than that of two regular CORESETs 702. For example, the scheduling entity can transmit a DCI 715 in the third dynamic CORESET 714 to schedule a third PDSCH 716 for upcoming DL data such that the third PDSCH 716 can provide additional downlink opportunity between the regular CORESETs 702. In some aspects, the scheduling entity can transmit the DCI 715 in the third dynamic CORESET 714 to schedule a PUSCH for upcoming UL data between the regular CORESETs 702.

Exemplary Control Resources Modification Using DCI Piggyback on PDSCH

Figure 8:
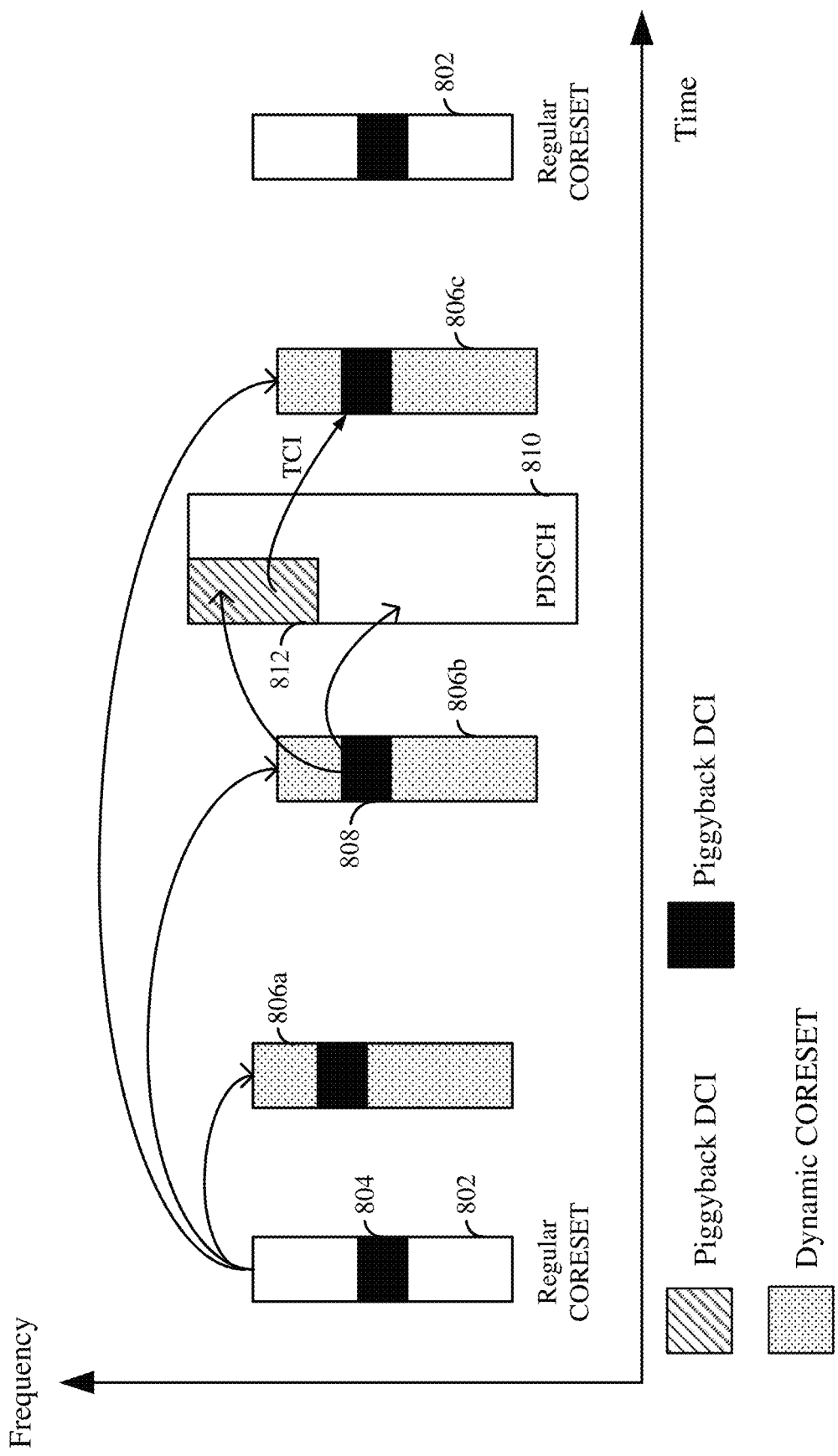
FIG. 8 is a drawing illustrating an example of dynamic control resources modification using piggyback DCI according to some aspects of the disclosure.

FIG. 8 is a drawing illustrating an example of dynamic control resources modification using piggyback DCI according to some aspects of the disclosure. A scheduling entity 108 may schedule regular or periodic control resources (e.g., regular CORESETs 802) that are sparse in the time domain relative to dynamic control resources. A DCI 804 in a regular CORESET 802 can schedule additional dynamic control resources between the regular CORESETs. In one example, the DCI 804 in the regular CORESET can schedule dynamic CORESETs (e.g., three aperiodic CORESETs 806a, 806b, and 806c shown in FIG. 8) between the regular CORESETs 802. The time interval between two dynamic CORESETs (e.g., CORESETs 806a and 806b) can be shorter than that of two regular CORESETs 802. The scheduling entity can transmit a DCI 808 in the second dynamic CORESET to schedule a PDSCH 810 with a piggyback DCI 812. In some aspects of the disclosure, the scheduling entity can use the piggyback DCI 812 to modify the third dynamic CORESET 806c that has already been scheduled in the regular CORE- SET 802 with certain CORESET parameters. In some aspects, the scheduling entity can use the piggyback DCI 812 to modify one or more parameters of the upcoming dynamic CORESET 806c. Examples of the parameters include time/frequency/spatial resources, a resource mapping type, precoding, beam configuration, aggregation level, and/or a number of PDCCH candidates.

In one example, the piggyback DCI 812 can modify a transmission configuration indicator (TCI) state of the upcoming dynamic CORESET. Generally, a TCI state indicates a transmission configuration between reference signals of a reference signal (RS) set and corresponding DM-RS ports. Each PDCCH search space candidate (common search space or UE-specific search space) may be associated with a TCI state. For example, a TCI state can indicate quasi co-location (QCL) information (e.g., QCL Type and time-frequency resources) of a DM-RS for the PDCCH search space candidate. Examples of QCL types may include one or more of Doppler shift, Doppler spread, average delay, delay spread, and a spatial RX parameter (e.g., beam). DM-RS ports that are quasi co-located are within one DM-RS group. DM-RS ports in different groups are not quasi co-located. For example, the TCI state may indicate to the UE that a Rx beam normally used to receive a first signal (e.g., signal A) may also be used to receive a second signal (e.g., signal B). In another example, the TCI state may indicate to the UE that a delay spread or frequency error estimated for another RS may also be used to demodulate the PDSCH.

Exemplary Control Resources Deactivation Using DCI Piggyback on PDSCH

Figure 9:
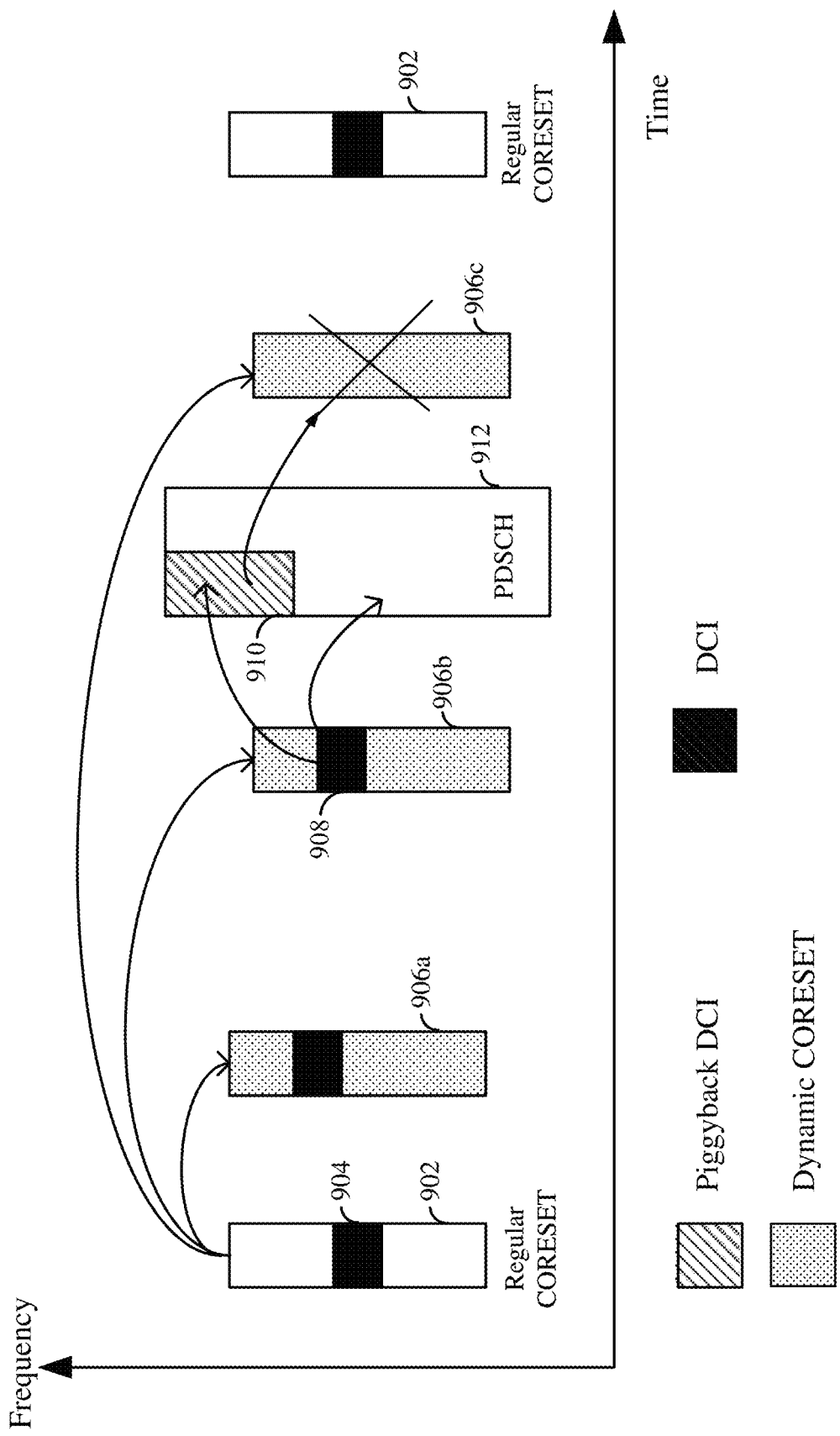
FIG. 9 is a drawing illustrating an example of dynamic control resources deactivation using piggyback DCI according to some aspects of the disclosure.

FIG. 9 is a drawing illustrating an example of dynamic control resources deactivation using piggyback DCI according to some aspects of the disclosure. A scheduling entity 108 may have scheduled regular or periodic control resources (e.g., regular CORESETs 902) that are sparse in the time domain relative to dynamic control resources. The scheduling entity can transmit a DCI 904 in the regular CORESET to schedule or activate dynamic control resources between the regular CORESETs 902. In one example, the scheduling entity may use the DCI 904 to schedule three dynamic CORESETs (e.g., aperiodic CORESETs 906a, 906b, and 906c) that can provide additional scheduling opportunities between the regular CORESETs 902. The time interval between two dynamic CORESETs is shorter than the time interval between the regular CORESETs 902. In one example, the scheduling entity can transmit a DCI 908 in the second dynamic CORESET to schedule a piggyback DCI 910 that is multiplexed with a PDSCH 912 for UE data traffic.

In one aspect, the scheduling entity can use the piggyback DCI 910 to skip, release, or deactivate one or more dynamic CORESETs. In one example, the scheduling entity may decide that there is no longer a need for the third dynamic CORESET 906c after the PDSCH 912, for example, because there is no more DL data buffered for transmission at the scheduling entity. When a targeted UE receives the piggyback DCI 910, the piggyback DCI causes the UE to skip monitoring the next one or more configured dynamic CORESETs (e.g., dynamic CORESET 906c). In some examples, the piggyback DCI may release or deactivate the dynamic CORESET(s) before the next regular CORESET.

In some aspects of the disclosure, the activation, modification, skipping, and/or deactivation of a CORESET can be applied based on a time interval between the piggyback DCI and the subject CORESET. For example, the activation, modification, skipping, and/or deactivation of a CORESET can be applied only if the time interval between the piggyback DCI and CORESET is greater than or equal to a predetermined timer or time duration. For example, the timer may start from the slot of the DCI. In one example, the scheduling entity can specify or signal the timer or time duration to the UE, for example, using RRC signaling. In one example, the timer can be based on UE capability (e.g., a preconfigured timer for a certain UE capability).

Piggyback DCI with Transmission Configuration Indicator

In some aspects of the disclosure, the TCI state of the PDCCH DM-RS of a CORESET scheduled/activated by the piggyback DCI may be determined based on a time interval between the piggyback DCI and the subject CORESET.

Figure 10:
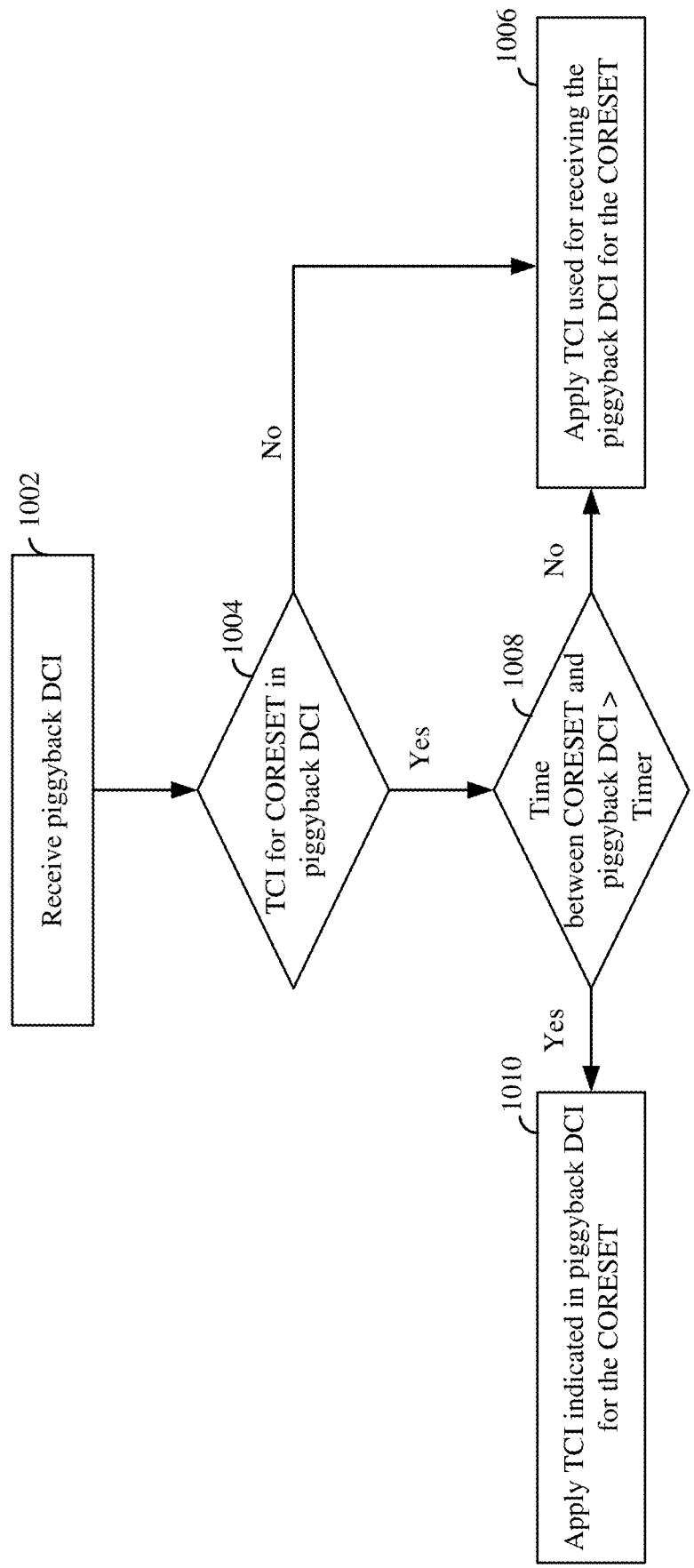
FIG. 10 is a flow chart illustrating a process for using piggyback DCI to configure the transmission configuration indicator (TCI) state of a CORESET.

FIG. 10 is a flow chart illustrating a process for using piggyback DCI to configure the TCI state of a CORESET. At block 1002, a UE can receive a piggyback DCI (e.g., piggyback DCI 512, 612, 710) from a scheduling entity. At block 1004, the UE determines whether or not the piggyback DCI indicates the TCI state for a CORESET (e.g., dynamic or regular CORESET). At block 1006, if the piggyback DCI does not indicate the TCI state for the CORESET, the UE can apply the TCI state used for receiving the piggyback DCI for the subject CORESET.

At decision block 1008, when the piggyback DCI indicates the TCI state for the subject CORESET, the UE decides whether or not a time duration between the subject CORESET and piggyback DCI is equal to or greater than a predetermined time interval. In one example, the UE can use a timer configured to measure a time duration between the DCI and the subject CORESET.

At block 1010, if the piggyback DCI indicates the TCI state for the subject CORESET, and a time duration between the subject CORESET (e.g., scheduled/activated/dynamic CORESET) and piggyback DCI is equal to or greater than a predetermined time interval, the UE applies the TCI state indicated in the piggyback DCI for the subject CORESET (e.g., CORESET 606c). The UE may track the time using a timer that may be configured by the scheduling entity. However, at block 1006, if a time duration between the subject CORESET and piggyback DCI is less than a predetermined time duration (e.g., a configured timer), the UE can apply the TCI state used for receiving the piggyback DCI for the subject CORESET.

Figure 11:
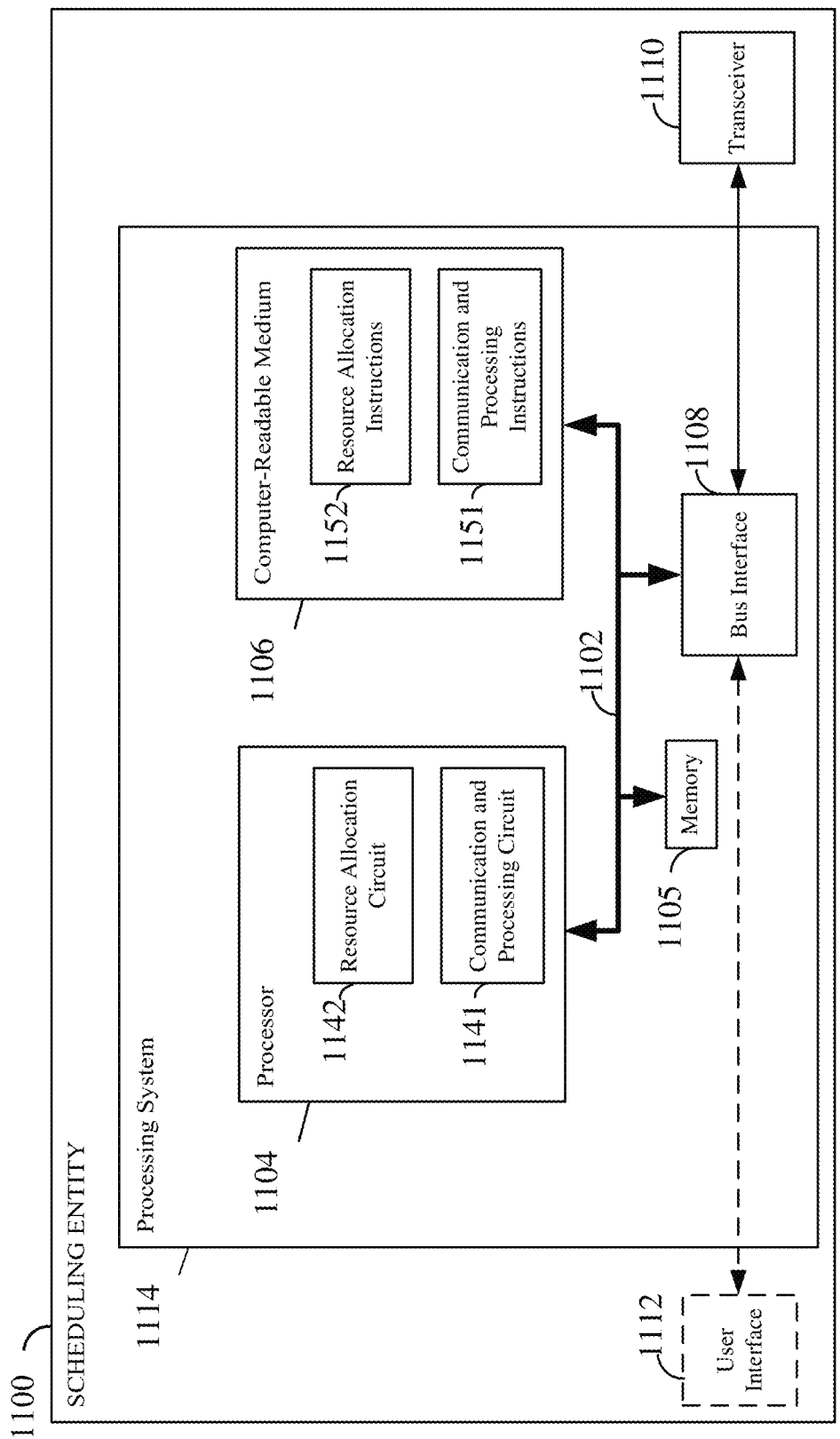
FIG. 11 is a block diagram conceptually illustrating an example of a hardware implementation for a scheduling entity according to some aspects of the disclosure.

FIG. 11 is a block diagram illustrating an example of a hardware implementation for a scheduling entity 1100 employing a processing system 1114. For example, the scheduling entity 1100 may be a base station (e.g., eNB or gNB) as illustrated in any one or more of FIGS. 1, 2, 3, and/or 13.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes and procedures described and illustrated in FIGS. 7-10, 12, and 13.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions, including, for example, control resource configuration using piggyback DCI in wireless communication. For example, the circuitry may be configured to implement one or more of the functions described in relation to FIGS. 7-10, 12, and 13.

In some aspects of the disclosure, the processor 1104 may include communication and processing circuitry 1141 configured for various functions, including for example communicating with a network core (e.g., a 5G core network), scheduled entities (e.g., UE), or any other entity, such as, for example, local infrastructure or an entity communicating with the scheduling entity 1100 via the Internet, such as a network provider. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1141 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 (e.g., PDSCH) and downlink control 114 (e.g., DCI/PDCCH)). The communication and processing circuitry 1141 may further be configured to execute communication and processing software 1151 stored on the computer-readable medium 1106 to implement one or more functions described herein.

In some aspects of the disclosure, the processor 1104 may include resource allocation circuitry 1142 configured for various functions, including for example, communication resource allocation and scheduling functions used in wireless communication. In some examples, the resource allocation circuitry 1142 may include one or more hardware components that provide the physical structure that performs processes related to resource allocation functions used in wireless communication. For example, the resource allocation circuitry 1142 can assign, allocate, modify, and schedule resources (e.g., time, frequency, and spatial resources) for CORESETs and search spaces for monitoring a PDCCH to a target UE. The resource allocation circuitry 1142 can also assign, allocate, modify, and schedule resources for uplink and downlink data traffic (e.g., PUSCH/PDSCH) between the scheduling entity and one or more UEs. The resource allocation circuitry 1142 may further be configured to execute resource allocation software 1152 stored on the computer-readable medium 1106 to implement one or more functions described herein.

Figure 12:
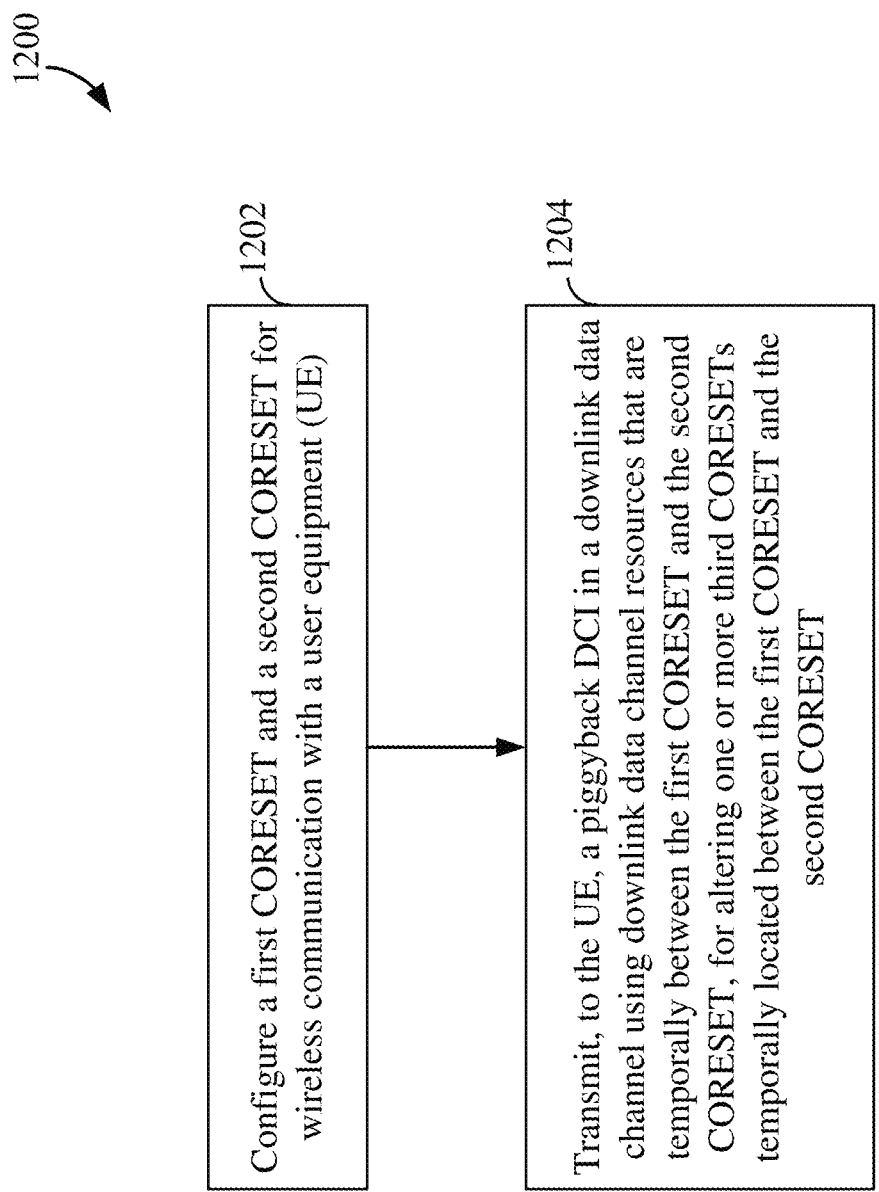
FIG. 12 is a flow chart illustrating an exemplary process for control resources configuration using piggyback DCI according to some aspects of the disclosure.

FIG. 12 is a flow chart illustrating an exemplary process 1200 for control resource configuration using piggyback DCI in accordance with some aspects of the present disclosure. As described below, some or all illustrated features may be omitted in a particular implementation within the scope of the present disclosure, and some illustrated features may not be required for the implementation of all embodiments. In some examples, the process 1200 may be carried out by the scheduling entity 1100 illustrated in FIG. 11. In some examples, the process 1200 may be carried out by any suitable apparatus (e.g., a scheduling entity 108 or bases station) or means for carrying out the functions or algorithm described below.

At block 1202, a scheduling entity can configure a first CORESET and a second CORESET for wireless communication with a UE. In one example, the resource allocation circuit 1140 can provide a means for configuring one or more CORESETs (e.g., first CORESET and second CORESET) and search space (SS) sets for the UE (e.g., UE 106).

In some examples, the first CORESET and second CORESET may correspond to the regular CORESETs described above in relation to FIGS. 7-9. In one example, the first and second CORESETs may be regular CORESETs that are periodic and sparse in the time domain relative to dynamic CORESETs that can be configured between the first and second CORESETs.

At block 1204, the scheduling entity transmits, to the UE, a piggyback DCI in a downlink data channel using downlink data channel resources that are temporally configured between the first CORESET and the second CORESET, for altering one or more third CORESETs that are temporally configured between the first CORESET and the second CORESET. In one aspect, the communication and processing circuit 1141 can provide a means for transmitting the piggyback DCI via the transceiver 1110. In one example, the downlink data channel resources may include a PDSCH (e.g., any of the PDSCH of FIGS. 7-9) for user traffic.

In some aspects, the piggyback DCI is configured for at least one of activating, modifying, or deactivating one or more control channel resources (e.g., regular, dynamic, periodic, and/or aperiodic CORESETs). In one example, the communication and processing circuit 1141 can provide a means for transmitting the piggyback DCI multiplexed with the PDSCH via the transceiver 1110 for a target UE. In some examples, the piggyback DCI may be similar to the piggyback DCIs described above in relation to FIGS. 7-9.

In one aspect, the piggyback DCI (e.g., piggyback DCI 1310) can alter one or more aperiodic or dynamic CORESETs and/or search spaces. In one aspect, the piggyback DCI can modify at least one parameter of the third CORESETs (e.g., dynamic CORESETs). The at least one parameter may include at least one of time-frequency resources, a resource mapping type, precoding, beam configuration, aggregation level, or a number of PDCCH candidates. In one example, the piggyback DCI may include a TCI state for the one or more third CORESETs. In one aspect, the piggyback DCI may deactivate a CORESET (e.g., dynamic or aperiodic CORESET). Deactivating a CORESET can mean not monitoring the PDCCH associated with the deactivated CORESET.

Figure 13:
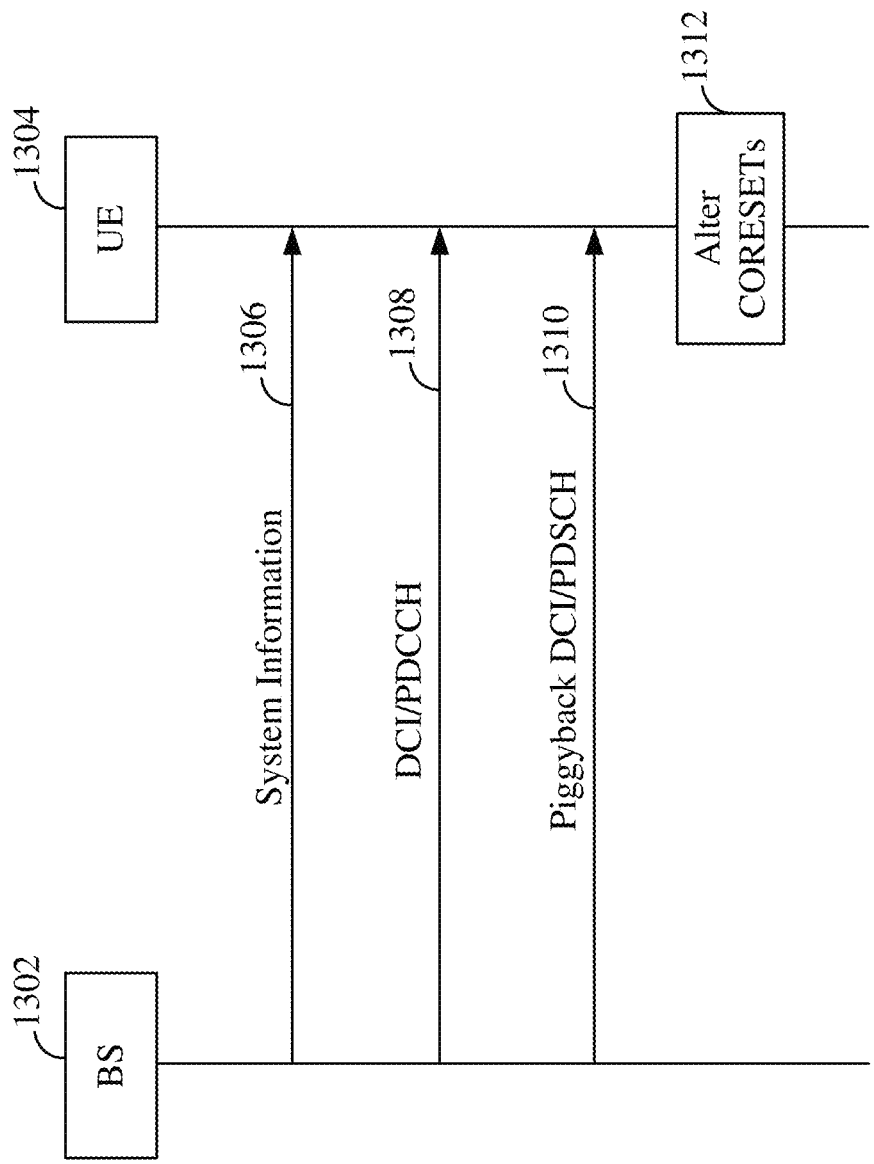
FIG. 13 is a diagram illustrating exemplary signaling between a scheduling entity and a UE for configuring CORESETs using piggyback DCI according to some aspects of the disclosure.

FIG. 13 is a diagram illustrating exemplary signaling between the scheduling entity (e.g., base station 1102) and the UE (e.g., UE 1104) for configuring CORESETs using piggyback DCI. In one aspect, the scheduling entity (e.g., base station 1102) may broadcast system information 1306 (e.g., MIB and/or OSI) that provides the CORESETs and/or SS configuration where the UE can monitor the PDCCH/DCI 1308, for example, in first CORESET and second CORESET.

Figure 14:
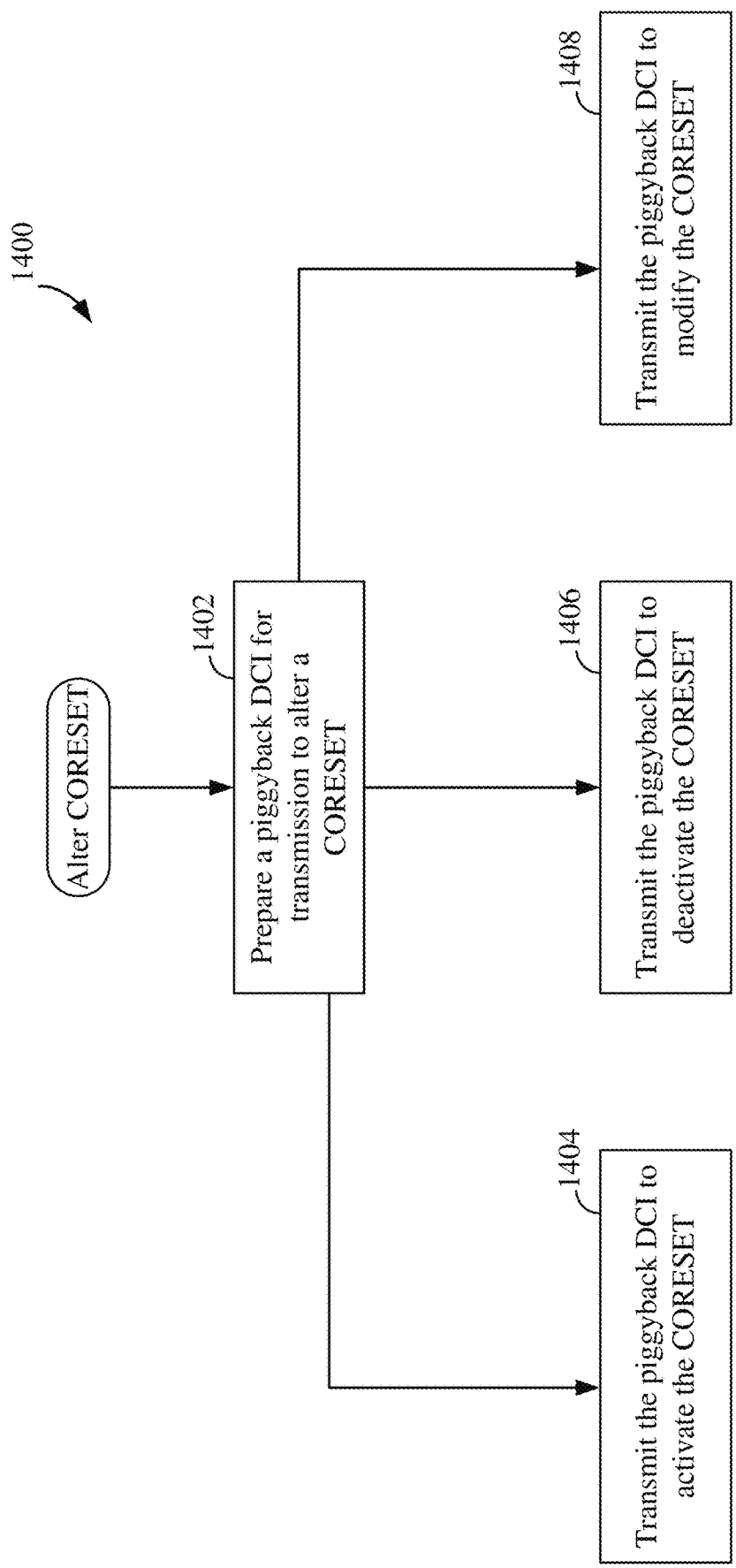
FIG. 14 is a flow chart illustrating an exemplary process for altering a CORESET using piggyback DCI according to some aspects of the present disclosure.

FIG. 14 is a flow chart illustrating an exemplary process 1400 for altering a CORESET using piggyback DCI in accordance with some aspects of the present disclosure. In some examples, the process 1400 may be carried out by the scheduling entity 1100 illustrated in FIG. 11 to alter a CORESET as described above in relation to block 1204. In some examples, the process 1400 may be carried out by any suitable apparatus (e.g., a scheduling entity 108 or bases station) or means for carrying out the functions or algorithm described below.

At block 1402, the scheduling entity can prepare a piggyback DCI for transmission to alter a CORESET. In some aspects, the piggyback DCI may be one of the piggyback DCIs described above in relation to FIGS. 7-9, for example, for activating, deactivating, or modifying a CORESET. At block 1404, the scheduling entity can transmit the piggyback DCI to activate the CORESET (e.g., dynamic CORESET 714). At block 1406, the scheduling entity can transmit the piggyback DCI to deactivate the CORESET (e.g., dynamic CORESET 906*c*). At block 1408, the scheduling entity can transmit the piggyback DCI to modify the CORESET (e.g., changing the TCI of dynamic CORESET 806*c*).

Figure 15:
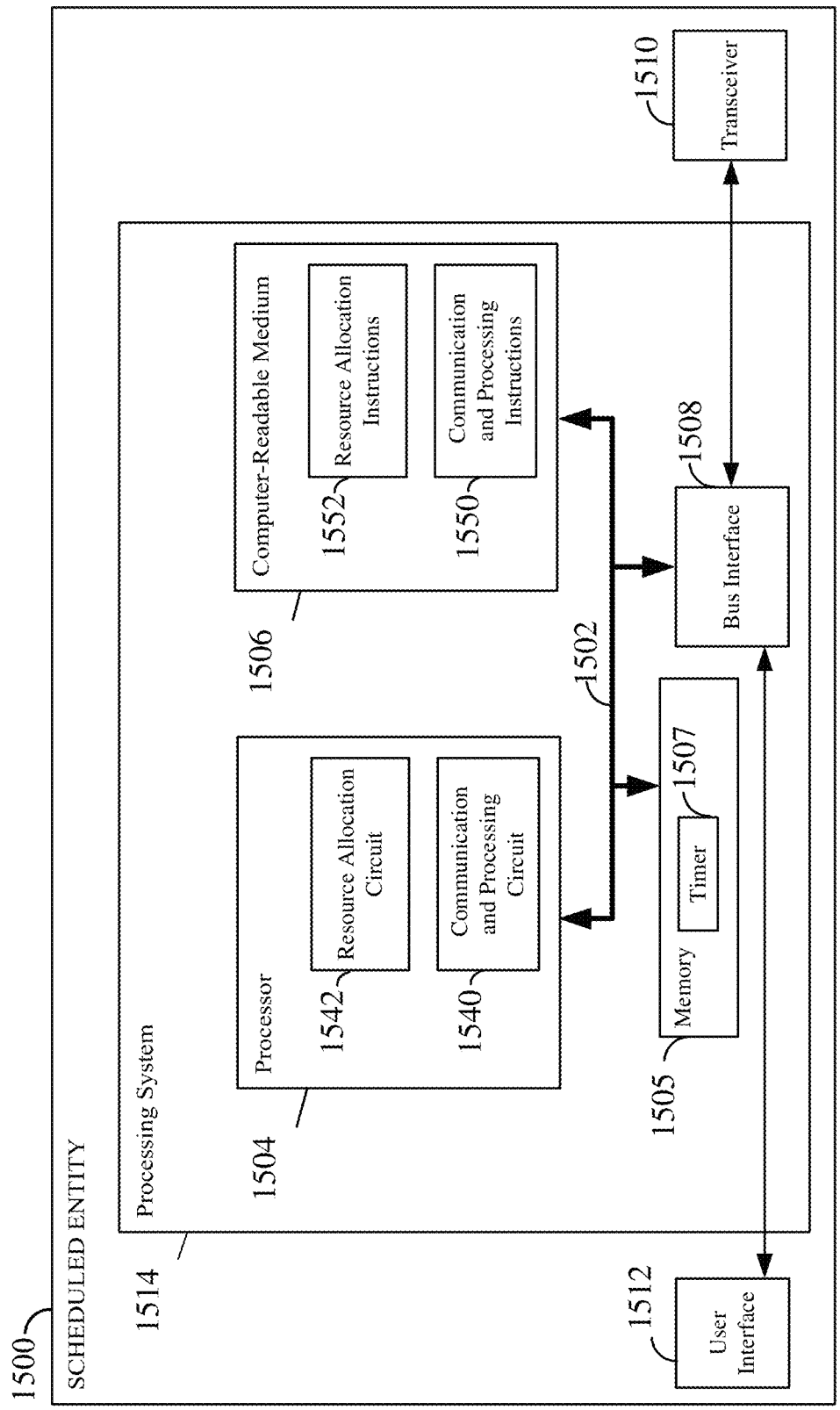
FIG. 15 is a block diagram conceptually illustrating an example of a hardware implementation for a scheduled entity according to some aspects of the disclosure.

FIG. 15 is a diagram illustrating an example of a hardware implementation for an exemplary scheduled entity 1500 employing a processing system 1514. In accordance with various aspects of the disclosure, an element, or any portion of an element, or any combination of elements may be implemented with a processing system 1514 that includes one or more processors 1504. For example, the scheduled entity 1500 may be a user equipment (UE) as illustrated in any one or more of FIGS. 1, 2, and/or 3.

The processing system 1514 may be substantially the same as the processing system 914 illustrated in FIG. 9, including a bus interface 1508, a bus 1502, memory 1505, a processor 1504, and a computer-readable medium 1506. In some aspects, the scheduled entity 1500 may maintain a timer 1507, for example, in the memory 1505. The scheduled entity may use the timer 1507 to measure a time duration. Furthermore, the scheduled entity 1500 may include a user interface 1512 and a transceiver 1510 substantially similar to those described above in FIG. 9. That is, the processor 1504, as utilized in a scheduled entity 1500, may be used to implement any one or more of the processes described and illustrated in FIGS. 7-10 and 16.

In some aspects of the disclosure, the processor 1504 may include circuitry configured for various functions, including, for example, control resource configuration using piggyback DCI in wireless communication. For example, the circuitry may be configured to implement one or more of the functions described in relation to FIGS. 7-10 and 116.

In some aspects of the disclosure, the processor 1504 may include communication and processing circuitry 1540 configured for various functions, including for example communicating with scheduling entities (e.g., gNB or eNB) via the transceiver 1510. In some examples, the communication and processing circuitry 1540 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1540 may be configured to process and transmit uplink traffic and uplink control messages (e.g., similar to uplink traffic 116 and uplink control 118 of FIG. 1), receive and process downlink traffic and downlink control messages (e.g., similar to downlink traffic 112 (e.g., PDSCH/piggyback DCI) and downlink control 114 (e.g., DCI/PDCCH)). The communication and processing circuitry 1540 may further be configured to execute communication and processing software 1550 stored on the computer-readable medium 1506 to implement one or more functions described herein.

In some aspects of the disclosure, the processor 1504 may include resource allocation circuitry 1542 configured for various functions, including for example, utilizing a resource allocation (e.g., time, frequency, and spatial resources) for CORESETs and search spaces to monitor a PDCCH/DCI. The resource allocation circuit 1542 can also configure the scheduled entity to utilize a resource allocation for uplink and downlink data traffic (e.g., PDSCH/piggyback DCI) between the scheduled entity and a network (e.g., scheduling entity). In some examples, the resource allocation circuitry 1542 may include one or more hardware components that provide the physical structure that performs processes related to resource allocation functions used in wireless communication. For example, the resource allocation circuitry 1542 can assign, allocate, and schedule resources (e.g., time, frequency, and spatial resources) for CORESETs and search spaces for monitoring a PDCCH. The resource allocation circuit 1542 can also assign, allocate, and schedule resources for uplink and downlink data traffic between the scheduled entity and a scheduling entity. The resource allocation circuitry 1542 may further be configured to execute resource allocation software 1552 stored on the computer-readable medium 1506 to implement one or more functions described herein.

Figure 16:
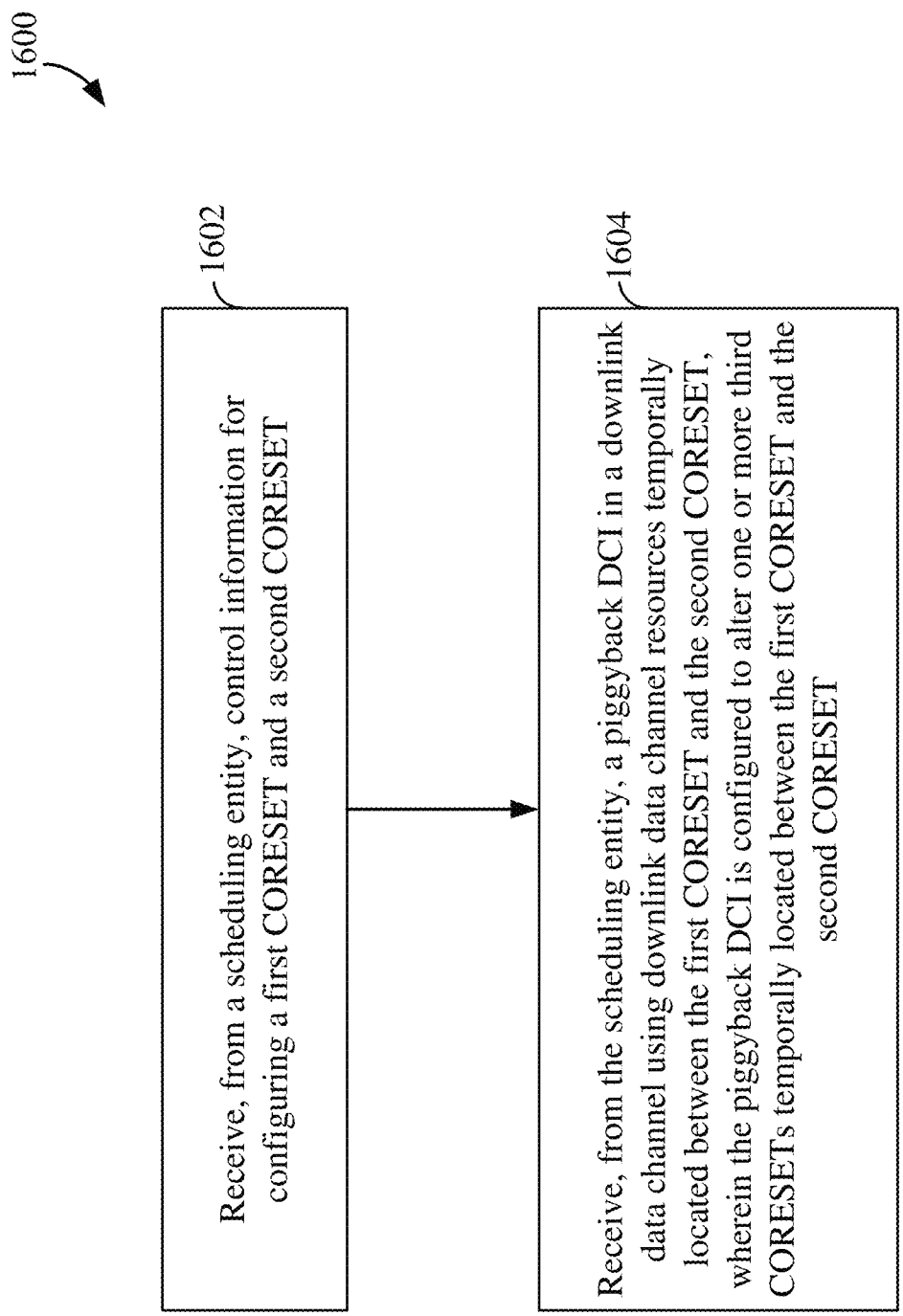
FIG. 16 is a flow chart illustrating an exemplary process for wireless communication using piggyback DCI for configuring control resources according to some aspects of the disclosure.

FIG. 16 is a flow chart illustrating an exemplary process 1600 for wireless communication using piggyback DCI for configuring control resources in accordance with some aspects of the disclosure. As described below, some or all illustrated features may be omitted in a particular implementation within the scope of the present disclosure, and some illustrated features may not be required for the implementation of all embodiments. In some examples, the process 1600 may be carried out by the scheduled entity 1500 illustrated in FIG. 15. In some examples, the process 1600 may be carried out by any suitable apparatus (e.g., UE 106) or means for carrying out the functions or algorithm described below.

At block 1602, a UE receives, from a scheduling entity, control information for configuring a first CORESET and a second CORESET. In one aspect, the communication and processing circuit 1540 can provide a means for receiving the control information via the transceiver 1510. In one aspect, the control information may be system information (e.g., system information 1106) broadcasted by the scheduling entity. The system information (e.g., MIB and/or OSI) can provide CORESETs (e.g., first and second CORESETs) and/or associated search space (SS) configuration. In some aspects, the UE can receive a first DCI in a downlink control channel (PDCCH) using first control channel resources from a scheduling entity (e.g., base station, eNB, or gNB). The first control channel resources may include one or more CORESETs and/or search spaces. The first DCI can indicate downlink data channel resources (e.g., PDSCH resources) configured for the UE. In one aspect, the resource allocation circuit 1542 can provide a means for determining the downlink data channel resources (e.g., PDSCH resources) based on the received DCI. In some examples, the UE may receive the first DCI in a periodic or regular CORESET that is sparsely scheduled relative to dynamic CORESET(s) between the first CORESET and second CORESET. In some examples, the UE may receive the first DCI in a dynamic CORESET between the first and second CORESETs.

At block 1604, the UE receives, from the scheduling entity, a piggyback DCI in a downlink data channel using downlink data channel resources temporally configured between the first CORESET and the second CORESET. The piggyback DCI is configured to alter one or more third CORESETs temporally configured between the first CORESET and the second CORESET. In one aspect, the communication and processing circuit 1540 can provide a means for receiving the piggyback DCI, for example, multiplexed with the PDSCH in the downlink data channel resources. In one example, the piggyback DCI may be similar to the piggyback DCIs described above in relation to FIGS. 7-9. In some aspects, the piggyback DCI may be configured for at least one of activating, modifying, or deactivating one or more second control channel resources configured for the UE. In one aspect, the second control channel resources may include regular (periodic) and/or dynamic (aperiodic) CORESETs.

In one aspect, the UE may configure a timer (e.g., timer 1507) for determining or measuring a predetermined time duration. The piggyback DCI can cause the UE to activate, modify, and/or deactivate the one or more second control channel resources (e.g., dynamic CORESETs) in consideration of a difference between the predetermined time duration and a time duration between the piggyback DCI and the second control channel resources. In one aspect, the piggyback DCI may cause the UE to monitor at least one dynamic or aperiodic CORESET for a PDCCH.

In one aspect, the piggyback DCI may cause the UE to modify at least one parameter of the one or more second control channel resources (e.g., CORESETs). The at least one parameter may include at least one of time-frequency resources, a resource mapping type, precoding, beam configuration, aggregation level, or a number of PDCCH candidates. In one aspect, the piggyback DCI may cause the UE to modify a TCI state of a PDCCH in the one or more second control channel resources, according to TCI information contained in the piggyback DCI. In one aspect, the piggyback DCI may cause the UE to modify a TCI state of a PDCCH in the one or more second control channel resources to be the same as a TCI state used for receiving the piggyback DCI.

In one aspect, the piggyback DCI may cause the UE to forgo (deactivate or skip) monitoring at least one CORESET for a PDCCH. For example, the UE may forgo monitoring at least one aperiodic or dynamic CORESET scheduled to occur before a periodic or regular CORESET.

Figure 17:
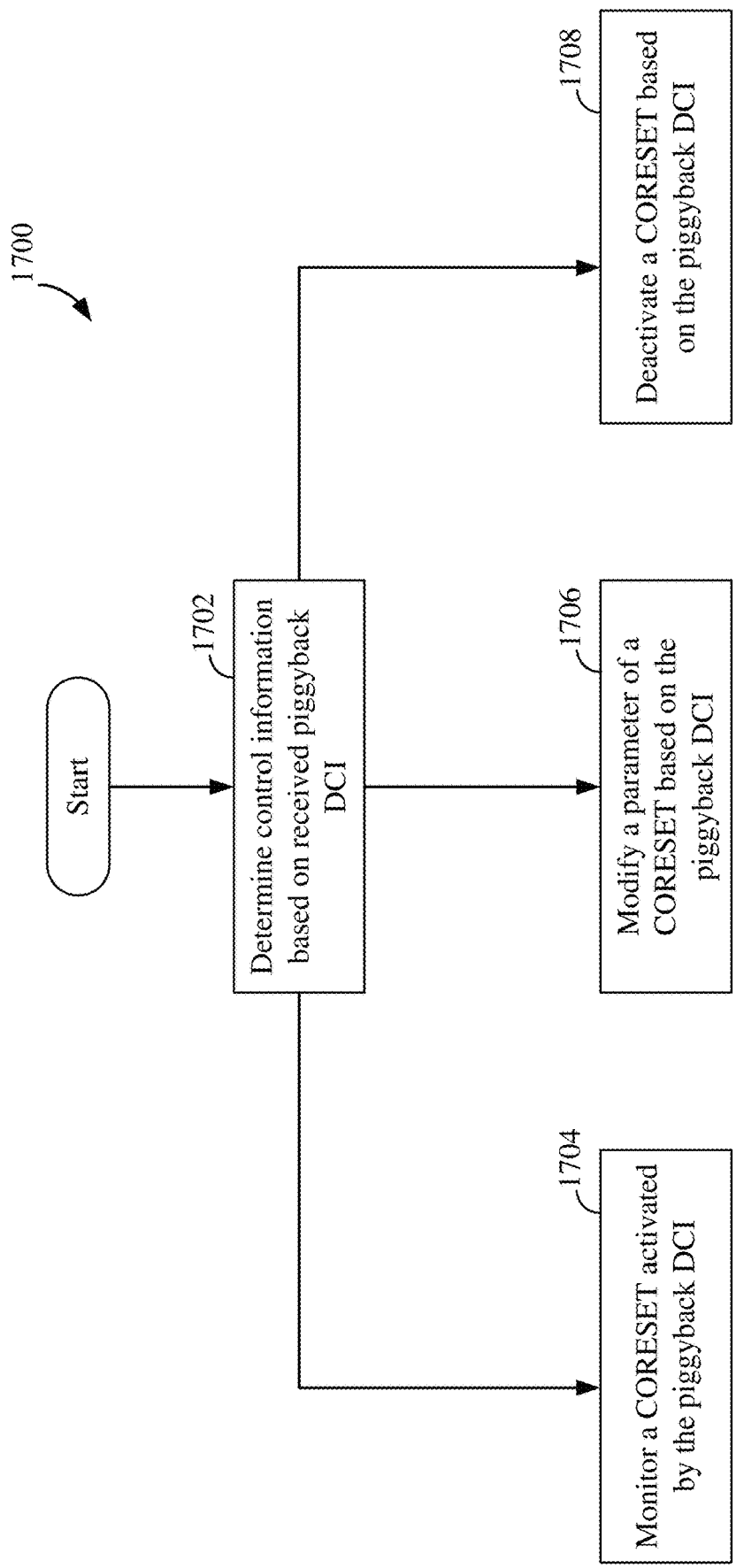
FIG. 17 is a flow chart illustrating an exemplary process for altering a CORESET based on a piggyback DCI according to some aspects of the present disclosure.

FIG. 17 is a flow chart illustrating an exemplary process 1700 for altering a CORESET based on a piggyback DCI in accordance with some aspects of the present disclosure. In some examples, the process 1700 may be carried out by the scheduled entity 1500 illustrated in FIG. 15 to alter a CORESET based on a piggyback DCI received from a scheduling entity as described above in relation to block 1604. In some examples, the process 1700 may be carried out by any suitable apparatus (e.g., a scheduled entity 106 or UE) or means for carrying out the functions or algorithm described below.

At block 1702, the scheduled entity can determine control information based on a piggyback DCI received from a scheduling entity. The control information may alter one or more CORESETs. In some aspects, the scheduled entity can alter a CORESET based on a time duration between the piggyback DCI and the CORESET. In some aspects, the piggyback DCI may be one of the piggyback DCIs described above in relation to FIGS. 7-9, for example, for activating, deactivating, or modifying a CORESET. At block 1704, the piggyback DCI can cause the scheduled entity to monitor a CORESET (e.g., dynamic CORESET 714). At block 1706, the piggyback DCI can cause the scheduled entity to modify a CORESET. For example, the schedule entity can modify at least one parameter of the CORESET. Examples of the parameter includes a TCI state of a PDCCH, time-frequency resources, a resource mapping type, a precoding parameter, a beam configuration, aggregation level, or a number of physical downlink control channel (PDCCH) candidates. At block 1708, the piggyback DCI can cause the scheduled entity to deactivate a CORESET (e.g., dynamic CORESET 906c).

Several aspects of a wireless communication network have been presented with reference to an exemplary implementation. As those skilled in the art will readily appreciate, various aspects described throughout this disclosure may be extended to other telecommunication systems, network architectures and communication standards.

In a first aspect, a method of wireless communication is provided. The method is operable at a scheduling entity and includes configuring a first control resource set (CORESET) and a second CORESET for wireless communication with a user equipment (UE). The method further includes transmitting, to the UE, a piggyback downlink control information (DCI) in a downlink data channel using downlink data channel resources that are temporally configured between the first CORESET and the second CORESET, for altering one or more third CORESETs temporally configured between the first CORESET and the second CORESET.

In a second aspect, alone or in combination with the first aspect, the piggyback DCI is configured to alter the one or more third CORESETs, at least in part, based on a time duration between the piggyback DCI and the one or more third CORESETs.

In a third aspect, alone or in combination with any of the first to second aspects, the altering the one or more third CORESETs includes at least one of: activating the one or more third CORESETs; deactivating the one or more third CORESETs ahead of a time corresponding to the second CORESET; or modifying the one or more third CORESETs.

In a fourth aspect, alone or in combination with the third aspect, the activating the one or more third CORESETs includes scheduling a physical downlink control channel (PDCCH) in the activated one or more third CORESETs.

In a fifth aspect, alone or in combination with the third aspect, the activating the one or more third CORESETs includes scheduling the one or more third CORESETs to occur before the upcoming second CORESET.

In a sixth aspect, alone or in combination with the third aspect, the modifying the one or more third CORESETs includes modifying at least one parameter of the one or more third CORESETs. The at least one parameter includes at least one of time-frequency resources, a resource mapping type, a precoding parameter, a beam configuration, an aggregation level, or a number of physical downlink control channel (PDCCH) candidates.

In a seventh aspect, alone or in combination with any of the first to sixth aspects, the piggyback DCI includes a transmission configuration indicator (TCI) for the one or more third CORESETs. The piggyback DCI is configured to alter the one or more third CORESETs based on the TCI and a time duration between the piggyback DCI and the one or more third CORESETs.

In an eighth aspect, a scheduling entity is provided. The scheduling entity includes a communication interface configured to communicate with a user equipment (UE), a memory, and a processor operatively coupled with the communication interface and the memory. The processor and the memory are configured to configure a first control resource set (CORESET) and a second CORESET for wireless communication with the UE. The processor and the memory are further configured to transmit, to the UE using the communication interface, a piggyback downlink control information (DCI) in a downlink data channel using downlink data channel resources that are temporally configured between the first CORESET and the second CORESET, for altering one or more third CORESETs configured located between the first CORESET and the second CORESET.

In a ninth aspect, alone or in combination with the eighth aspect, the piggyback DCI is configured to alter the one or more third CORESETs, at least in part, based on a time duration between the piggyback DCI and the one or more third CORESETs.

In a tenth aspect, alone or in combination with any of the eighth to ninth aspects, the processor and the memory are further configured to alter the one or more third CORESETs by at least one of: activating the one or more third CORESETs; deactivating the one or more third CORESETs ahead of a time corresponding to the second CORESET; or modifying the one or more third CORESETs.

In an eleventh aspect, alone or in combination with the tenth aspect, the processor and the memory are further configured to schedule a physical downlink control channel (PDCCH) in the activated one or more third CORESETs.

In a twelfth aspect, alone or in combination with any of the tenth to eleventh aspects, the processor and the memory are further configured to schedule the activated one or more third CORESETs to occur before the upcoming second CORESET.

In a thirteenth aspect, alone or in combination with the tenth aspect, the processor and the memory are further configured to modify at least one parameter of the one or more third CORESETs. The at least one parameter includes at least one of time-frequency resources, a resource mapping type, a precoding parameter, a beam configuration, an aggregation level, or a number of physical downlink control channel (PDCCH) candidates.

In a fourteenth aspect, alone or in combination with any of the eighth to thirteen aspects, the piggyback DCI includes a transmission configuration indicator (TCI) for the one or more third CORESETs, and the piggyback DCI is configured to alter the one or more third CORESETs based on the TCI and a time duration between the piggyback DCI and the one or more third CORESETs.

In a fifteenth aspect, a method of wireless communication is provided. The method is operable at a user equipment (UE), and includes receiving, from a scheduling entity, control information for configuring a first control resource set (CORESET) and a second CORESET. The method further includes receiving, from the scheduling entity, a piggyback downlink control information (DCI) in a downlink data channel using downlink data channel resources temporally configured between the first CORESET and the second CORESET. The piggyback DCI is configured to alter one or more third CORESETs temporally configured between the first CORESET and the second CORESET.

In a sixteenth aspect, alone or in combination with the fifteenth aspect, the piggyback DCI is configured to alter the one or more third CORESETs, at least in part, based on a time duration between the piggyback DCI and the one or more third CORESETs.

In a seventeenth aspect, alone or in combination with any of the fifteenth to sixteenth aspects, the piggyback DCI is configured to activate the one or more third CORESETs. The method further includes monitoring the one or more third CORESETs for a physical downlink control channel (PDCCH) in the one or more third CORESETs activated by the piggyback DCI.

In an eighteenth aspect, alone or in combination with any of the fifteenth to seventeenth aspects, the one or more third CORESETs includes at least one dynamic CORESET. The method further includes monitoring the at least one dynamic CORESET before an upcoming periodic CORESET.

In a nineteenth aspect, alone or in combination with any of the fifteenth to eighteenth aspects, the piggyback DCI is configured to modify at least one parameter of the one or more third CORESETs. The at least one parameter includes at least one of time-frequency resources, a resource mapping type, a precoding parameter, a beam configuration, aggregation level, or a number of physical downlink control channel (PDCCH) candidates.

In a twentieth aspect, alone or in combination with any of the fifteenth to nineteenth aspects, the piggyback DCI is configured to modify a transmission configuration indicator (TCI) state of a physical downlink control channel (PDCCH) in the one or more third CORESETs, according to TCI information contained in the piggyback DCI and based on a time duration between the piggyback DCI and the PDCCH.

In a twenty-first aspect, alone or in combination with any of the fifteenth to nineteenth aspects, the piggyback DCI is configured to modify a transmission configuration indicator (TCI) state of a physical downlink control channel (PDCCH) in the one or more third CORESETs to be the same as a TCI state used for receiving the piggyback DCI and based on a time duration between the piggyback DCI and the PDCCH.

In a twenty-second aspect, alone or in combination with the fifteenth aspect, the piggyback DCI is configured to deactivate the one or more third CORESETs, and the method further includes forgoing monitoring the one or more third CORESETs deactivated by the piggyback DCI.

In a twenty-third aspect, a user equipment (UE) is provided. The UE includes a communication interface configured to communicate with a scheduling entity, a memory, and a processor operatively coupled with the communication interface and the memory. The processor and the memory are configured to receive, from the scheduling entity using the communication interface, control information for configuring a first control resource set (CORESET) and a second CORESET. The processor and the memory are further configured to receive, from the scheduling entity, a piggyback downlink control information (DCI) in a downlink data channel using downlink data channel resources temporally configured between the first CORESET and the second CORESET. The piggyback DCI is configured to control one or more third CORESETs temporally configured between the first CORESET and the second CORESET.

In a twenty-fourth aspect, alone or in combination with the twenty-third aspect, the piggyback DCI is configured to control the one or more third CORESETs, at least in part, based on a time duration between the piggyback DCI and the one or more third CORESETs.

In a twenty-fifth aspect, alone or in combination with any of the twenty-third to twenty-fourth aspects, the piggyback DCI is configured to activate the one or more third CORESETs, and the processor and the memory are further configured to monitor the one or more third CORESETs for a physical downlink control channel (PDCCH) in the one or more third CORESETs activated by the piggyback DCI.

In a twenty-sixth aspect, alone or in combination with any of the twenty-third to twenty-five aspects, the one or more third CORESETs include at least one dynamic CORESET, and the processor and the memory are further configured to monitor the at least one dynamic CORESET before an upcoming periodic CORESET.

In a twenty-seventh aspect, alone or in combination with any of the twenty-third to twenty-sixth aspects, the piggyback DCI is configured to modify at least one parameter of the one or more third CORESETs. The at least one parameter includes at least one of time-frequency resources, a resource mapping type, a precoding parameter, a beam configuration, aggregation level, or a number of physical downlink control channel (PDCCH) candidates.

In a twenty-eighth aspect, alone or in combination with any of the twenty-third to twenty-seventh aspects, the piggyback DCI is configured to modify a transmission configuration indicator (TCI) state of a physical downlink control channel (PDCCH) in the one or more third CORESETs, according to TCI information contained in the piggyback DCI and based on a time duration between the piggyback DCI and the PDCCH.

In a twenty-ninth aspect, alone or in combination with any of the twenty-third to twenty-seventh aspects, the piggyback DCI is configured to modify a transmission configuration indicator (TCI) state of a physical downlink control channel (PDCCH) in the one or more third CORESETs to be the same as a TCI state used for receiving the piggyback DCI and based on a time duration between the piggyback DCI and the PDCCH.

In a thirtieth aspect, alone or in combination with the twenty-third aspect, the piggyback DCI is configured to deactivate the one or more third CORESETs, and the processor and the memory are further configured to forgo monitoring the one or more third CORESETs deactivated by the piggyback DCI.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a scheduling entity, comprising:
   configuring a first control resource set (CORESET) and a second CORESET for wireless communication with a user equipment (UE); and
   transmitting, to the UE, a piggyback downlink control information (DCI) in a downlink data channel using downlink data channel resources that are temporally configured between the first CORESET and the second CORESET, for altering one or more third CORESETs temporally configured between the first CORESET and the second CORESET.

2. The method of claim 1, wherein the piggyback DCI is configured to alter the one or more third CORESETs, at least in part, based on a time duration between the piggyback DCI and the one or more third CORESETs.

3. The method of claim 1, wherein the altering the one or more third CORESETs comprises at least one of:
   activating the one or more third CORESETs;
   deactivating the one or more third CORESETs ahead of a time corresponding to the second CORESET; or
   modifying the one or more third CORESETs.

4. The method of claim 3, wherein the activating the one or more third CORESETs comprises:
   scheduling a physical downlink control channel (PDCCH) in the activated one or more third CORESETs.

5. The method of claim 3, wherein the activating the one or more third CORESETs comprises:
   scheduling the one or more third CORESETs to occur before the upcoming second CORESET.

6. The method of claim 3, wherein the modifying the one or more third CORESETs comprises:
   modifying at least one parameter of the one or more third CORESETs,
   wherein the at least one parameter comprises at least one of time-frequency resources, a resource mapping type, a precoding parameter, a beam configuration, an aggregation level, or a number of physical downlink control channel (PDCCH) candidates.

7. The method of claim 1,
   wherein the piggyback DCI comprises a transmission configuration indicator (TCI) for the one or more third CORESETs, and
   wherein the piggyback DCI is configured to alter the one or more third CORESETs based on the TCI and a time duration between the piggyback DCI and the one or more third CORESETs.

8. A scheduling entity, comprising:
   a communication interface configured to communicate with a user equipment (UE);
   a memory; and
   a processor operatively coupled with the communication interface and the memory,
   wherein the processor and the memory are configured to:
      configure a first control resource set (CORESET) and a second CORESET for wireless communication with the UE; and
      transmit, to the UE using the communication interface, a piggyback downlink control information (DCI) in a downlink data channel using downlink data channel resources that are temporally configured between the first CORESET and the second CORESET, for altering one or more third CORESETs temporally configured between the first CORESET and the second CORESET.

9. The scheduling entity of claim 8, wherein the piggyback DCI is configured to alter the one or more third CORESETs, at least in part, based on a time duration between the piggyback DCI and the one or more third CORESETs.

10. The scheduling entity of claim 8, wherein the processor and the memory are further configured to alter the one or more third CORESETs by at least one of:
    activating the one or more third CORESETs;
    deactivating the one or more third CORESETs ahead of a time corresponding to the second CORESET; or
    modifying the one or more third CORESETs.

11. The scheduling entity of claim 10, wherein the processor and the memory are further configured to:
    schedule a physical downlink control channel (PDCCH) in the activated one or more third CORESETs.

12. The scheduling entity of claim 10, wherein the processor and the memory are further configured to:
    schedule the activated one or more third CORESETs to occur before the upcoming second CORESET.

13. The scheduling entity of claim 10, wherein the processor and the memory are further configured to:
    modify at least one parameter of the one or more third CORESETs, wherein the at least one parameter comprises at least one of time-frequency resources, a resource mapping type, a precoding parameter, a beam configuration, an aggregation level, or a number of physical downlink control channel (PDCCH) candidates.

14. The scheduling entity of claim 8,
wherein the piggyback DCI comprises a transmission configuration indicator (TCI) for the one or more third CORESETs, and
wherein the piggyback DCI is configured to alter the one or more third CORESETs based on the TCI and a time duration between the piggyback DCI and the one or more third CORESETs.

15. A method of wireless communication at a user equipment (UE), comprising:
receiving, from a scheduling entity, control information for configuring a first control resource set (CORESET) and a second CORESET; and
receiving, from the scheduling entity, a piggyback downlink control information (DCI) in a downlink data channel using downlink data channel resources temporally configured between the first CORESET and the second CORESET,
wherein the piggyback DCI is configured to alter one or more third CORESETs temporally configured between the first CORESET and the second CORESET.

16. The method of claim 15, wherein the piggyback DCI is configured to alter the one or more third CORESETs, at least in part, based on a time duration between the piggyback DCI and the one or more third CORESETs.

17. The method of claim 15, wherein the piggyback DCI is configured to activate the one or more third CORESETs, the method further comprising:
monitoring the one or more third CORESETs for a physical downlink control channel (PDCCH) in the one or more third CORESETs activated by the piggyback DCI.

18. The method of claim 17, wherein the one or more third CORESETs comprises at least one dynamic CORESET, the method further comprising:
monitoring the at least one dynamic CORESET before an upcoming periodic CORESET.

19. The method of claim 15, wherein the piggyback DCI is configured to modify at least one parameter of the one or more third CORESETs,
wherein the at least one parameter comprises at least one of time-frequency resources, a resource mapping type, a precoding parameter, a beam configuration, aggregation level, or a number of physical downlink control channel (PDCCH) candidates.

20. The method of claim 15, wherein the piggyback DCI is configured to modify a transmission configuration indicator (TCI) state of a physical downlink control channel (PDCCH) in the one or more third CORESETs, according to TCI information contained in the piggyback DCI and based on a time duration between the piggyback DCI and the PDCCH.

21. The method of claim 15, wherein the piggyback DCI is configured to modify a transmission configuration indicator (TCI) state of a physical downlink control channel (PDCCH) in the one or more third CORESETs to be the same as a TCI state used for receiving the piggyback DCI and based on a time duration between the piggyback DCI and the PDCCH.

22. The method of claim 15, wherein the piggyback DCI is configured to deactivate the one or more third CORESETs, the method further comprising:
forgoing monitoring the one or more third CORESETs deactivated by the piggyback DCI.

23. A user equipment (UE), comprising:
a communication interface configured to communicate with a scheduling entity;
a memory; and
a processor operatively coupled with the communication interface and the memory,
wherein the processor and the memory are configured to:
receive, from the scheduling entity using the communication interface, control information for configuring a first control resource set (CORESET) and a second CORESET; and
receive, from the scheduling entity, a piggyback downlink control information (DCI) in a downlink data channel using downlink data channel resources temporally configured between the first CORESET and the second CORESET,
wherein the piggyback DCI is configured to control one or more third CORESETs temporally configured between the first CORESET and the second CORESET.

24. The scheduled entity of claim 23, wherein the piggyback DCI is configured to control the one or more third CORESETs, at least in part, based on a time duration between the piggyback DCI and the one or more third CORESETs.

25. The scheduled entity of claim 23, wherein the piggyback DCI is configured to activate the one or more third CORESETs, the processor and the memory are further configured to:
monitor the one or more third CORESETs for a physical downlink control channel (PDCCH) in the one or more third CORESETs activated by the piggyback DCI.

26. The scheduled entity of claim 25, wherein the one or more third CORESETs comprises at least one dynamic CORESET, the processor and the memory are further configured to:
monitor the at least one dynamic CORESET before an upcoming periodic CORESET.

27. The scheduled entity of claim 23, wherein the piggyback DCI is configured to modify at least one parameter of the one or more third CORESETs,
wherein the at least one parameter comprises at least one of time-frequency resources, a resource mapping type, a precoding parameter, a beam configuration, aggregation level, or a number of physical downlink control channel (PDCCH) candidates.

28. The scheduled entity of claim 23, wherein the piggyback DCI is configured to modify a transmission configuration indicator (TCI) state of a physical downlink control channel (PDCCH) in the one or more third CORESETs, according to TCI information contained in the piggyback DCI and based on a time duration between the piggyback DCI and the PDCCH.

29. The scheduled entity of claim 23, wherein the piggyback DCI is configured to modify a transmission configuration indicator (TCI) state of a physical downlink control channel (PDCCH) in the one or more third CORESETs to be the same as a TCI state used for receiving the piggyback DCI and based on a time duration between the piggyback DCI and the PDCCH.

30. The scheduled entity of claim 23, wherein the piggyback DCI is configured to deactivate the one or more third CORESETs, the processor and the memory are further configured to:

forgo monitoring the one or more third CORESETs deactivated by the piggyback DCI.

\* \* \* \* \*